(12) United States Patent
Yorav-Raphael et al.

(10) Patent No.: US 12,196,940 B2
(45) Date of Patent: *Jan. 14, 2025

(54) SAMPLE CARRIER FOR MICROSCOPY AND OPTICAL DENSITY MEASUREMENTS

(71) Applicant: S.D. SIGHT DIAGNOSTICS LTD, Tel Aviv (IL)

(72) Inventors: Noam Yorav-Raphael, Tekoa (IL); Joseph Joel Pollak, Neve Daniel (IL); Sarah Levy Schreier, Jaffa (IL); Yochay Shlomo Eshel, Sde Warburg (IL)

(73) Assignee: S.D. Sight Diagnostics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,324

(22) Filed: Dec. 27, 2023

(65) Prior Publication Data
US 2024/0126060 A1    Apr. 18, 2024

Related U.S. Application Data

(63) Continuation of application No. 16/763,810, filed as application No. PCT/IB2018/058861 on Nov. 12, 2018, now Pat. No. 11,921,272.
(Continued)

(51) Int. Cl.
*G02B 21/00*   (2006.01)
*G01N 21/64*   (2006.01)
*G02B 21/36*   (2006.01)

(52) U.S. Cl.
CPC ..... *G02B 21/0076* (2013.01); *G01N 21/6456* (2013.01); *G02B 21/36* (2013.01)

(58) Field of Classification Search
None
See application file for complete search history.

(56) References Cited

U.S. PATENT DOCUMENTS

| 3,203,768 A | 8/1965 | Tiller et al. |
| 3,603,156 A | 9/1971 | Konkol |

(Continued)

FOREIGN PATENT DOCUMENTS

| CA | 2655024 C | 1/2008 |
| CN | 1918501 A1 | 2/2007 |

(Continued)

OTHER PUBLICATIONS

Office Action dated Dec. 19, 2023 which issued during the prosecution of Canadian Application No. 3,018,536.
(Continued)

*Primary Examiner* — David P Porta
*Assistant Examiner* — Mamadou Faye
(74) *Attorney, Agent, or Firm* — Sughrue Mion, PLLC

(57) ABSTRACT

Apparatus and methods are described for determining a property of a bodily sample using a microscope and optical-density-measurement apparatus, the apparatus including a sample carrier that includes a plurality of microscopy sample chambers configured to receive a first portion of the sample and to facilitate imaging of the first portion of the sample by the microscope, each of the microscopy sample chambers having an upper and a lower surface, and having respective heights between the upper and lower surfaces that are different from each other. The sample carrier includes at least one optical-density-measurement chamber configured to receive a second portion of the sample, and to facilitate optical density measurements being performed optical-density-measurement apparatus upon the second portion of the sample. Other applications are also described.

8 Claims, 14 Drawing Sheets

Related U.S. Application Data

(60) Provisional application No. 62/585,621, filed on Nov. 14, 2017.

(56) References Cited

U.S. PATENT DOCUMENTS

| | | | |
|---|---|---|---|
| 3,676,076 | A | 7/1972 | Grady |
| 3,786,184 | A | 1/1974 | Pieters |
| 3,916,205 | A | 10/1975 | Kleinerman |
| 3,967,056 | A | 6/1976 | Yata et al. |
| 4,030,888 | A | 6/1977 | Yamamoto |
| 4,076,419 | A | 2/1978 | Kleker |
| 4,097,845 | A | 6/1978 | Bacus |
| 4,199,748 | A | 4/1980 | Bacus |
| 4,209,548 | A | 6/1980 | Bacus |
| 4,350,884 | A | 9/1982 | Dieter |
| 4,453,266 | A | 6/1984 | Bacus |
| 4,454,235 | A | 6/1984 | Johnson |
| 4,494,479 | A | 1/1985 | Drury et al. |
| 4,580,895 | A | 4/1986 | Patel |
| 4,700,298 | A | 10/1987 | Palcic et al. |
| 4,761,381 | A | 8/1988 | Blatt et al. |
| 4,774,192 | A | 9/1988 | Terminiello et al. |
| 4,803,352 | A | 2/1989 | Bierleutgeb |
| 4,849,340 | A | 7/1989 | Oberhardt |
| 4,849,430 | A | 7/1989 | Fleet |
| 4,851,330 | A | 7/1989 | Kohne |
| 4,902,101 | A | 2/1990 | Fujihara et al. |
| 5,001,067 | A | 3/1991 | Coleman et al. |
| 5,064,282 | A | 11/1991 | Curtis |
| 5,229,265 | A | 7/1993 | Tometsko |
| 5,300,779 | A | 4/1994 | Hillman et al. |
| 5,331,958 | A | 7/1994 | Oppenheimer |
| 5,430,542 | A | 7/1995 | Shepherd et al. |
| 5,470,751 | A | 11/1995 | Sakata et al. |
| 5,499,097 | A | 3/1996 | Ortyn et al. |
| 5,566,249 | A | 10/1996 | Rosenlof et al. |
| 5,625,706 | A | 4/1997 | Lee et al. |
| 5,663,057 | A | 9/1997 | Drocourt et al. |
| 5,671,288 | A | 9/1997 | Wilhelm et al. |
| 5,672,861 | A | 9/1997 | Fairley et al. |
| 5,674,457 | A | 10/1997 | Williamsson et al. |
| 5,745,804 | A | 4/1998 | Iwane |
| 5,782,770 | A | 7/1998 | Mooradian et al. |
| 5,827,190 | A | 10/1998 | Palcic et al. |
| 5,834,217 | A | 11/1998 | Levine et al. |
| 5,932,872 | A | 8/1999 | Price |
| 5,948,686 | A | 9/1999 | Wardlaw et al. |
| 5,978,497 | A | 11/1999 | Lee et al. |
| 5,985,595 | A | 11/1999 | Krider et al. |
| 5,993,702 | A | 11/1999 | Davis |
| 6,005,964 | A | 12/1999 | Reid et al. |
| 6,027,695 | A | 2/2000 | Oldenburg et al. |
| 6,064,474 | A | 5/2000 | Lee |
| 6,074,879 | A | 6/2000 | Zelmanovic et al. |
| 6,101,404 | A | 8/2000 | Yoon et al. |
| 6,235,536 | B1 | 5/2001 | Wardlaw |
| 6,262,423 | B1 | 7/2001 | Hell et al. |
| 6,262,798 | B1 | 7/2001 | Shepherd et al. |
| 6,320,979 | B1 | 11/2001 | Melen |
| 6,330,348 | B1 | 12/2001 | Kerschmann et al. |
| 6,339,472 | B1 | 1/2002 | Hafeman |
| 6,350,613 | B1 | 2/2002 | Wardlaw et al. |
| 6,448,024 | B1 | 9/2002 | Bruegger |
| 6,519,355 | B2 | 2/2003 | Nelson |
| 6,554,788 | B1 | 4/2003 | Hunley et al. |
| 6,582,964 | B1 | 6/2003 | Samsoondar et al. |
| 6,611,777 | B2 | 8/2003 | Samsoondar |
| 6,632,681 | B1 | 10/2003 | Chu |
| 6,658,143 | B2 | 12/2003 | Hansen |
| 6,664,528 | B1 | 12/2003 | Cartlidge et al. |
| 6,711,516 | B2 | 3/2004 | Samsoondar |
| 6,799,119 | B1 | 9/2004 | Voorhees et al. |
| 6,819,408 | B1 | 11/2004 | Scrivens et al. |
| 6,831,733 | B2 | 12/2004 | Pettersson |
| 6,834,237 | B2 | 12/2004 | Noergaard et al. |
| 6,836,559 | B2 | 12/2004 | Abdel-fattah |
| 6,842,233 | B2 | 1/2005 | Narisada |
| 6,866,823 | B2 | 3/2005 | Wardlaw |
| 6,872,930 | B2 | 3/2005 | Cartlidge et al. |
| 6,898,451 | B2 | 5/2005 | Wuori |
| 6,903,323 | B2 | 6/2005 | Cartlidge et al. |
| 6,929,953 | B1 | 8/2005 | Wardlaw et al. |
| 6,949,384 | B2 | 9/2005 | Samsoondar |
| 6,955,872 | B2 | 10/2005 | Maples et al. |
| 6,956,650 | B2 | 10/2005 | Boas |
| 6,989,891 | B2 | 1/2006 | Braig et al. |
| 7,027,628 | B1 | 4/2006 | Gagnon |
| 7,030,351 | B2 | 4/2006 | Wasserman |
| 7,034,883 | B1 | 4/2006 | Rosenqvist |
| 7,105,795 | B2 | 9/2006 | Cartlidge et al. |
| 7,132,636 | B1 | 11/2006 | Cartlidge |
| 7,133,547 | B2 | 11/2006 | Marcelpoil |
| 7,151,246 | B2 | 12/2006 | Fein et al. |
| 7,155,049 | B2 | 12/2006 | Wetzel |
| 7,248,716 | B2 | 7/2007 | Fein et al. |
| 7,274,810 | B2 | 9/2007 | Reeves et al. |
| 7,283,217 | B2 | 10/2007 | Ikeuchi |
| 7,288,751 | B2 | 10/2007 | Cartlidge et al. |
| 7,305,109 | B1 | 12/2007 | Gagnon |
| 7,324,694 | B2 | 1/2008 | Chapoulaud |
| 7,329,537 | B2 | 2/2008 | Qiu |
| 7,338,168 | B2 | 3/2008 | Cartlidge et al. |
| 7,344,890 | B2 | 3/2008 | Perez et al. |
| 7,346,205 | B2 | 3/2008 | Walker, Jr. |
| 7,369,696 | B2 | 5/2008 | Arini et al. |
| 7,387,898 | B1 | 6/2008 | Gordon |
| 7,411,680 | B2 | 8/2008 | Chang |
| 7,417,213 | B2 | 8/2008 | Krief et al. |
| 7,385,168 | B2 | 9/2008 | Cartlidge et al. |
| 7,425,421 | B2 | 9/2008 | Dertinger |
| 7,439,478 | B2 | 10/2008 | Cartlidge et al. |
| 7,450,223 | B2 | 11/2008 | Ikeuchi |
| 7,450,762 | B2 | 11/2008 | Morell |
| 7,460,222 | B2 | 12/2008 | Kalveram |
| 7,490,085 | B2 | 2/2009 | Walker et al. |
| 7,493,219 | B1 | 2/2009 | Qi |
| 7,580,120 | B2 | 8/2009 | Hamada |
| 7,599,893 | B2 | 10/2009 | Sapir |
| 7,601,938 | B2 | 10/2009 | Cartlidge et al. |
| 7,602,954 | B2 | 10/2009 | Marcelpoil |
| 7,605,356 | B2 | 10/2009 | Krief |
| 7,609,369 | B2 | 10/2009 | Simon-Lopez |
| 7,630,063 | B2 | 12/2009 | Padmanabhan |
| 7,633,604 | B2 | 12/2009 | Ikeuchi |
| 7,638,748 | B2 | 12/2009 | Krief et al. |
| 7,663,738 | B2 | 2/2010 | Johansson |
| 7,668,362 | B2 | 2/2010 | Olson |
| 7,692,131 | B2 | 4/2010 | Fein et al. |
| 7,697,764 | B2 | 4/2010 | Kataoka |
| 7,702,181 | B2 | 4/2010 | Gouch |
| 7,706,862 | B2 | 4/2010 | Alfano et al. |
| 7,713,474 | B2 | 5/2010 | Schulman et al. |
| 7,747,153 | B2 | 6/2010 | Ibaraki |
| 7,765,069 | B2 | 7/2010 | Ostoich |
| 7,777,869 | B2 | 8/2010 | Nerin |
| 7,787,109 | B2 | 8/2010 | Dosmann et al. |
| 7,796,797 | B2 | 9/2010 | Nakaya et al. |
| 7,863,552 | B2 | 1/2011 | Cartlidge et al. |
| 7,869,009 | B2 | 1/2011 | Dosmann et al. |
| 7,894,047 | B2 | 2/2011 | Hamada |
| 7,911,617 | B2 | 3/2011 | Padmanabhan |
| 7,925,070 | B2 | 4/2011 | Sumida |
| 7,929,121 | B2 | 4/2011 | Wardlaw |
| 7,933,435 | B2 | 4/2011 | Hunter |
| 7,936,913 | B2 | 5/2011 | Nordell |
| 7,951,599 | B2 | 5/2011 | Levine |
| 7,995,200 | B2 | 8/2011 | Matsumoto |
| 7,998,435 | B2 | 8/2011 | Reed et al. |
| 8,000,511 | B2 | 8/2011 | Perz |
| 8,044,974 | B2 | 10/2011 | Sumida |
| 8,045,782 | B2 | 10/2011 | Li |
| 8,055,471 | B2 | 11/2011 | Qi |
| 8,064,680 | B2 | 11/2011 | Ramoser |
| 8,077,296 | B2 | 12/2011 | Wardlaw |

(56) References Cited

U.S. PATENT DOCUMENTS

| | | |
|---|---|---|
| 8,081,303 B2 | 12/2011 | Levine |
| 8,105,554 B2 | 1/2012 | Kanigan et al. |
| 8,125,643 B2 | 2/2012 | Hansen |
| D655,421 S | 3/2012 | Lee et al. |
| 8,131,035 B2 | 3/2012 | Grady |
| 8,131,052 B2 | 3/2012 | Alexandrov |
| 8,150,114 B2 | 4/2012 | Svanberg |
| 8,154,713 B2 | 4/2012 | Simon-Lopez |
| 8,165,385 B2 | 4/2012 | Reeves |
| 8,175,353 B2 | 5/2012 | Westphal |
| 8,179,597 B2 | 5/2012 | Namba et al. |
| 8,184,273 B2 | 5/2012 | Dosmann |
| 8,192,995 B2 | 6/2012 | Zhang et al. |
| 8,216,832 B2 | 7/2012 | Battrell et al. |
| 8,224,058 B2 | 7/2012 | Lindberg |
| 8,269,954 B2 | 9/2012 | Levine |
| 8,280,134 B2 | 10/2012 | Hoyt |
| 8,310,659 B2 | 11/2012 | Wardlaw |
| 8,320,655 B2 | 11/2012 | Sarachan |
| 8,327,724 B2 | 12/2012 | Fairs et al. |
| 8,331,642 B2 | 12/2012 | Zerfass |
| 8,339,586 B2 | 12/2012 | Zahniser |
| 8,345,227 B2 | 1/2013 | Zahniser |
| 8,351,676 B2 | 1/2013 | Dai |
| 8,363,221 B2 | 1/2013 | Hansen |
| 8,379,944 B2 | 2/2013 | Grady |
| 8,406,498 B2 | 3/2013 | Ortyn et al. |
| 8,428,331 B2 | 4/2013 | Dimarzio |
| 8,432,392 B2 | 4/2013 | Kim |
| 8,477,294 B2 | 7/2013 | Zahniser |
| 8,481,303 B2 | 7/2013 | Faris et al. |
| 8,488,111 B2 | 7/2013 | Zahniser |
| 8,491,499 B2 | 7/2013 | Choi et al. |
| 8,526,704 B2 | 9/2013 | Dobbe |
| 8,570,496 B2 | 10/2013 | Chen |
| 8,582,924 B2 | 11/2013 | De La |
| 8,638,427 B2 | 1/2014 | Wardlaw |
| 8,712,142 B2 | 4/2014 | Rajpoot |
| 8,736,824 B2 | 5/2014 | Matsui |
| 8,744,165 B2 | 6/2014 | Liu |
| 8,778,687 B2 | 7/2014 | Levine |
| 8,787,650 B2 | 7/2014 | Muragame |
| 8,792,693 B2 | 7/2014 | Satish |
| 8,837,803 B2 | 9/2014 | Wang et al. |
| 8,849,024 B2 | 9/2014 | Shinoda |
| 8,873,827 B2 | 10/2014 | Mcculloch |
| 8,877,458 B2 | 11/2014 | Maurer |
| 8,878,923 B2 | 11/2014 | Henderson |
| 8,885,154 B2 | 11/2014 | Wardlaw |
| 8,885,912 B2 | 11/2014 | Sui |
| 8,891,851 B2 | 11/2014 | Spaulding |
| 8,922,761 B2 | 12/2014 | Zahniser |
| 8,942,458 B2 | 1/2015 | Takahashi |
| 8,964,171 B2 | 2/2015 | Zahniser |
| 8,992,750 B1 | 3/2015 | Beaty |
| 8,994,930 B2 | 3/2015 | Levine |
| 9,012,868 B2 | 4/2015 | Courtney et al. |
| 9,041,792 B2 | 5/2015 | Van Leeuwen |
| 9,050,595 B2 | 6/2015 | Miller et al. |
| 9,064,301 B2 | 6/2015 | Zie et al. |
| 9,046,473 B2 | 9/2015 | Levine |
| 9,176,121 B2 | 11/2015 | Winkelman et al. |
| 9,186,843 B2 | 11/2015 | Chan et al. |
| 9,240,043 B2 | 1/2016 | Christiansen |
| 9,322,767 B2 | 4/2016 | Ehrenkranz |
| 9,329,129 B2 | 5/2016 | Pollak et al. |
| 9,342,734 B2 | 5/2016 | Lin et al. |
| 9,404,852 B2 | 8/2016 | Braig et al. |
| 9,470,609 B2 | 10/2016 | Wimberger-friedl |
| 9,477,875 B2 | 10/2016 | Ohya |
| 9,522,396 B2 | 12/2016 | Bachelet |
| 9,528,978 B2 | 12/2016 | Yamada |
| 9,588,033 B2 | 3/2017 | Zahniser et al. |
| 9,767,343 B1 | 9/2017 | Jones et al. |
| 9,820,990 B2 | 11/2017 | Pak et al. |
| 9,933,363 B2 | 4/2018 | Danuser et al. |
| 9,934,571 B2 | 4/2018 | Ozaki |
| 9,976,945 B2 | 5/2018 | Kendall et al. |
| 10,024,858 B2 | 7/2018 | Smith et al. |
| 10,061,972 B2 | 8/2018 | Champlin |
| 10,093,957 B2 | 10/2018 | Pollak et al. |
| 10,169,861 B2 | 1/2019 | Ozaki et al. |
| 10,176,565 B2 | 1/2019 | Greenfield |
| 10,281,386 B2 | 5/2019 | Hsu et al. |
| 10,395,368 B2 | 8/2019 | Berezhna et al. |
| 10,482,595 B2 | 11/2019 | Yorav-Raphael et al. |
| 10,488,644 B2 | 11/2019 | Eshel et al. |
| 10,508,983 B2 | 12/2019 | Kendall et al. |
| 10,527,635 B1 | 1/2020 | Bhatia et al. |
| 10,640,807 B2 | 5/2020 | Pollak et al. |
| 10,663,712 B2 | 5/2020 | Eshel et al. |
| 10,843,190 B2 | 11/2020 | Bachelet et al. |
| 11,099,175 B2 | 8/2021 | Zait |
| 11,199,690 B2 | 12/2021 | Eshel et al. |
| 11,609,413 B2 * | 3/2023 | Yorav-Raphael ..... B01L 3/5027 |
| 2002/0009711 A1 | 1/2002 | Wada et al. |
| 2002/0028158 A1 | 3/2002 | Wardlaw |
| 2002/0028471 A1 | 3/2002 | Oberhardt |
| 2003/0017085 A1 | 3/2003 | Kercso et al. |
| 2003/0161514 A1 | 8/2003 | Curry |
| 2003/0170613 A1 | 9/2003 | Straus |
| 2003/0197925 A1 | 10/2003 | Hamborg |
| 2003/0208140 A1* | 11/2003 | Pugh ................ A61B 5/150022 |
| | | 600/584 |
| 2003/0224522 A1 | 12/2003 | De Jong et al. |
| 2003/0227612 A1 | 12/2003 | Fein et al. |
| 2003/0227673 A1 | 12/2003 | Nakagawa |
| 2003/0231791 A1 | 12/2003 | Torre-Bueno et al. |
| 2004/0241677 A1 | 2/2004 | Lin et al. |
| 2004/0054283 A1 | 3/2004 | Corey et al. |
| 2004/0122216 A1 | 6/2004 | Nielsen et al. |
| 2004/0132171 A1 | 7/2004 | Rule et al. |
| 2004/0170312 A1 | 9/2004 | Soenksen |
| 2004/0185447 A1 | 9/2004 | Maples et al. |
| 2004/0218804 A1 | 11/2004 | Affleck et al. |
| 2004/0240050 A1 | 12/2004 | Ogihara |
| 2005/0089208 A1 | 4/2005 | Dong et al. |
| 2005/0109959 A1 | 5/2005 | Wasserman et al. |
| 2005/0175992 A1 | 8/2005 | Aberl et al. |
| 2005/0286800 A1 | 12/2005 | Gouch |
| 2006/0002817 A1 | 1/2006 | Bohm et al. |
| 2006/0003458 A1 | 1/2006 | Golovchenko et al. |
| 2006/0045505 A1 | 3/2006 | Zeineh |
| 2006/0051778 A1 | 3/2006 | Kallick |
| 2006/0063185 A1 | 3/2006 | Vannier |
| 2006/0079144 A1 | 4/2006 | Klisch et al. |
| 2006/0187442 A1 | 8/2006 | Chang et al. |
| 2006/0190226 A1 | 8/2006 | Wardlaw et al. |
| 2006/0222567 A1 | 10/2006 | Kloepfer |
| 2006/0223052 A1 | 10/2006 | Macdonald et al. |
| 2006/0223165 A1 | 10/2006 | Chang et al. |
| 2007/0252984 A1 | 1/2007 | Van Beek et al. |
| 2007/0054350 A1 | 3/2007 | Walker |
| 2007/0076190 A1 | 4/2007 | Nakaya et al. |
| 2007/0161075 A1 | 7/2007 | Gleich |
| 2007/0172956 A1 | 7/2007 | Magari et al. |
| 2007/0231914 A1 | 10/2007 | Deng et al. |
| 2007/0243117 A1 | 10/2007 | Wardlaw et al. |
| 2007/0250301 A1 | 10/2007 | Vaisberg et al. |
| 2008/0019584 A1 | 1/2008 | Lindberg et al. |
| 2008/0020128 A1 | 1/2008 | van Ryper |
| 2008/0059135 A1 | 3/2008 | Murugkar et al. |
| 2008/0118399 A1 | 5/2008 | Fleming |
| 2008/0187466 A1 | 8/2008 | Wardlaw et al. |
| 2008/0212069 A1 | 9/2008 | Goldberg et al. |
| 2008/0260369 A1 | 10/2008 | Ibaraki |
| 2008/0273776 A1 | 11/2008 | Krief et al. |
| 2008/0305514 A1 | 12/2008 | Alford et al. |
| 2009/0066934 A1 | 3/2009 | Gao et al. |
| 2009/0074282 A1 | 3/2009 | Pinard et al. |
| 2009/0075324 A1 | 3/2009 | Pettersson |
| 2009/0086314 A1 | 4/2009 | Namba et al. |
| 2009/0088336 A1 | 4/2009 | Burd et al. |
| 2009/0128618 A1 | 5/2009 | Fahn et al. |

(56) References Cited

U.S. PATENT DOCUMENTS

| | | |
|---|---|---|
| 2009/0185734 A1 | 7/2009 | Lindberg et al. |
| 2009/0191098 A1 | 7/2009 | Beard et al. |
| 2009/0195688 A1 | 8/2009 | Henderson et al. |
| 2009/0213214 A1 | 8/2009 | Yamada |
| 2009/0258347 A1 | 10/2009 | Scott |
| 2009/0269799 A1 | 10/2009 | Winkelman et al. |
| 2009/0291854 A1 | 11/2009 | Wiesinger-Mayr et al. |
| 2010/0003265 A1 | 1/2010 | Scheffler et al. |
| 2010/0068747 A1 | 3/2010 | Herrenknecht |
| 2010/0104169 A1 | 4/2010 | Yamada |
| 2010/0112631 A1 | 5/2010 | Hur et al. |
| 2010/0120129 A1 | 5/2010 | Amshey et al. |
| 2010/0136556 A1 | 6/2010 | Friedberger et al. |
| 2010/0136570 A1 | 6/2010 | Goldberg et al. |
| 2010/0152054 A1 | 6/2010 | Love |
| 2010/0157086 A1 | 6/2010 | Segale et al. |
| 2010/0172020 A1 | 7/2010 | Price |
| 2010/0192706 A1 | 8/2010 | Fairs et al. |
| 2010/0232675 A1 | 9/2010 | Ortyn et al. |
| 2010/0234703 A1 | 9/2010 | Sterling et al. |
| 2010/0253907 A1 | 10/2010 | Korb et al. |
| 2010/0254596 A1 | 10/2010 | Xiong |
| 2010/0256918 A1 | 10/2010 | Chen et al. |
| 2010/0265323 A1 | 10/2010 | Perz |
| 2010/0272334 A1 | 10/2010 | Yamada et al. |
| 2010/0295998 A1 | 11/2010 | Sakai et al. |
| 2010/0300563 A1 | 12/2010 | Ramunas et al. |
| 2011/0007178 A1 | 1/2011 | Kahlman |
| 2011/0009163 A1 | 1/2011 | Fletcher |
| 2011/0030458 A1 | 2/2011 | Park et al. |
| 2011/0059481 A1 | 3/2011 | Wardlaw et al. |
| 2011/0102571 A1 | 5/2011 | Yoneyama |
| 2011/0123398 A1 | 5/2011 | Carrhilo et al. |
| 2011/0144480 A1 | 6/2011 | Lu et al. |
| 2011/0149097 A1 | 6/2011 | Danuser et al. |
| 2011/0151502 A1 | 6/2011 | Kendall et al. |
| 2011/0178716 A1 | 7/2011 | Krockenberger et al. |
| 2011/0212486 A1 | 9/2011 | Yamada |
| 2011/0243794 A1 | 10/2011 | Wardlaw |
| 2011/0249910 A1 | 10/2011 | Henderson |
| 2011/0275111 A1 | 11/2011 | Pettigrew et al. |
| 2011/0301012 A1 | 12/2011 | Dolecek et al. |
| 2012/0002195 A1 | 1/2012 | Wu et al. |
| 2012/0021951 A1 | 1/2012 | Hess et al. |
| 2012/0030618 A1 | 2/2012 | Leong et al. |
| 2012/0044342 A1 | 2/2012 | Hing et al. |
| 2012/0058504 A1 | 3/2012 | Li et al. |
| 2012/0092477 A1 | 4/2012 | Kawano et al. |
| 2012/0120221 A1 | 5/2012 | Dong et al. |
| 2012/0169863 A1 | 7/2012 | Bachelet et al. |
| 2012/0225446 A1 | 9/2012 | Wimberger-friedl et al. |
| 2012/0237107 A1 | 9/2012 | Tawfik et al. |
| 2012/0275671 A1 | 11/2012 | Eichhorn et al. |
| 2012/0312957 A1 | 12/2012 | Loney et al. |
| 2012/0320045 A1 | 12/2012 | Yao |
| 2013/0023007 A1 | 1/2013 | Zahniser et al. |
| 2013/0078668 A1 | 3/2013 | Levine et al. |
| 2013/0130262 A1 | 5/2013 | Battrell et al. |
| 2013/0169948 A1 | 7/2013 | Xie et al. |
| 2013/0170730 A1 | 7/2013 | Yu et al. |
| 2013/0176551 A1 | 7/2013 | Wardlaw et al. |
| 2013/0177974 A1 | 7/2013 | Mamghani et al. |
| 2013/0203082 A1 | 8/2013 | Gonda et al. |
| 2013/0273968 A1 | 10/2013 | Rhoads et al. |
| 2013/0284924 A1 | 10/2013 | Mizuochi et al. |
| 2013/0290225 A1 | 10/2013 | Kamath et al. |
| 2013/0323757 A1 | 12/2013 | Poher et al. |
| 2014/0139625 A1 | 5/2014 | Mathuis et al. |
| 2014/0139630 A1 | 5/2014 | Kowalevicz |
| 2014/0185906 A1 | 7/2014 | Ding et al. |
| 2014/0186859 A1 | 7/2014 | Calderwood et al. |
| 2014/0205176 A1 | 7/2014 | Obrien et al. |
| 2014/0270425 A1 | 9/2014 | Kenny et al. |
| 2014/0273064 A1 | 9/2014 | Smith et al. |
| 2014/0347459 A1 | 11/2014 | Greenfield et al. |
| 2014/0347463 A1 | 11/2014 | Lin et al. |
| 2014/0353524 A1 | 12/2014 | Danuser et al. |
| 2015/0022882 A1 | 1/2015 | Ue et al. |
| 2015/0037806 A1 | 2/2015 | Pollak et al. |
| 2015/0124082 A1 | 5/2015 | Kato et al. |
| 2015/0183153 A1 | 7/2015 | Chan et al. |
| 2015/0190063 A1 | 7/2015 | Zakharov et al. |
| 2015/0246170 A1 | 9/2015 | Miao et al. |
| 2015/0278575 A1 | 10/2015 | Allano et al. |
| 2015/0302237 A1 | 10/2015 | Ohya et al. |
| 2015/0316477 A1 | 11/2015 | Pollak et al. |
| 2016/0042507 A1 | 2/2016 | Turner |
| 2016/0146750 A1 | 5/2016 | Hughes et al. |
| 2016/0168614 A1* | 6/2016 | Hunt ................. C12Q 1/68 435/7.1 |
| 2016/0187235 A1 | 6/2016 | Fine |
| 2016/0208306 A1 | 7/2016 | Pollak et al. |
| 2016/0246046 A1 | 8/2016 | Yorav-Raphael et al. |
| 2016/0250312 A1 | 9/2016 | Longley et al. |
| 2016/0279633 A1 | 9/2016 | Bachelet et al. |
| 2017/0052110 A1 | 2/2017 | Malissek et al. |
| 2017/0115271 A1 | 4/2017 | Xie et al. |
| 2017/0146558 A1 | 5/2017 | Ishii et al. |
| 2017/0160185 A1 | 6/2017 | Minemura et al. |
| 2017/0191945 A1 | 7/2017 | Zhang et al. |
| 2017/0218425 A1 | 8/2017 | Chen et al. |
| 2017/0292905 A1 | 10/2017 | Obrien et al. |
| 2017/0307496 A1 | 10/2017 | Zahniser et al. |
| 2017/0326549 A1 | 11/2017 | Jones et al. |
| 2017/0328924 A1 | 11/2017 | Jones et al. |
| 2018/0080885 A1* | 3/2018 | Ginsberg ........... G01N 23/2254 |
| 2018/0246313 A1 | 8/2018 | Eshel et al. |
| 2018/0259318 A1 | 9/2018 | Yelin et al. |
| 2018/0296102 A1 | 10/2018 | Satish et al. |
| 2018/0297024 A1 | 10/2018 | Tran |
| 2019/0002950 A1 | 1/2019 | Pollak et al. |
| 2019/0087953 A1 | 3/2019 | Yorav-Raphael et al. |
| 2019/0110718 A1 | 4/2019 | Brittenham et al. |
| 2019/0130567 A1 | 5/2019 | Greenfield et al. |
| 2019/0145963 A1 | 5/2019 | Zait et al. |
| 2019/0266723 A1 | 8/2019 | Blanchard et al. |
| 2019/0302099 A1 | 10/2019 | Pollak et al. |
| 2019/0324255 A1 | 10/2019 | Pergande et al. |
| 2019/0347467 A1 | 11/2019 | Ohsaka et al. |
| 2020/0034967 A1 | 1/2020 | Yorav-Raphael et al. |
| 2020/0049970 A1 | 2/2020 | Eshel et al. |
| 2020/0111209 A1 | 4/2020 | Greenfield et al. |
| 2020/0249458 A1 | 8/2020 | Eshel et al. |
| 2020/0300750 A1 | 9/2020 | Eshel et al. |
| 2022/0189016 A1 | 6/2022 | Barnes et al. |

FOREIGN PATENT DOCUMENTS

| | | |
|---|---|---|
| CN | 101501785 A | 8/2009 |
| CN | 101403650 B | 6/2010 |
| CN | 102282467 A | 12/2011 |
| CN | 104094118 A | 10/2014 |
| CN | 105556276 A | 5/2016 |
| EP | 0073551 A2 | 3/1983 |
| EP | 0479231 A1 | 4/1992 |
| EP | 1381229 A1 | 1/2004 |
| EP | 1698883 A1 | 9/2006 |
| EP | 2145684 A2 | 1/2010 |
| EP | 2211165 A2 | 7/2010 |
| EP | 3001174 A1 | 3/2016 |
| EP | 3123927 | 2/2017 |
| EP | 3482189 | 5/2019 |
| EP | 1873232 | 2/2020 |
| GB | 2329014 A | 3/1999 |
| JP | 60-162955 A | 8/1985 |
| JP | 61198204 A | 9/1986 |
| JP | 7-504038 A | 4/1995 |
| JP | H08-313340 A | 11/1996 |
| JP | 9-54083 A | 2/1997 |
| JP | H11-73903 A | 3/1999 |
| JP | 2000-199845 A | 7/2000 |
| JP | 2002-516982 | 6/2002 |
| JP | 2004-144526 A | 5/2004 |
| JP | 2004-257768 A | 9/2004 |

(56) References Cited

FOREIGN PATENT DOCUMENTS

| | | |
|---|---|---|
| JP | 2006-506607 A | 2/2006 |
| JP | 2006-301270 A | 11/2006 |
| JP | 2007-040814 A | 2/2007 |
| JP | 2009-180539 | 8/2009 |
| JP | 2009-233927 A | 10/2009 |
| JP | 2009-268432 A | 11/2009 |
| JP | 2011-95225 A | 5/2011 |
| JP | 2013-515264 | 5/2013 |
| JP | 2013-541767 | 11/2013 |
| JP | 2014-041139 | 3/2014 |
| JP | 2015-57600 A | 3/2015 |
| JP | 2016-070658 | 5/2016 |
| JP | 2016-528506 A | 9/2016 |
| JP | 2017-209530 | 11/2017 |
| JP | 2018-525611 A | 9/2018 |
| JP | 2018-534605 A | 11/2018 |
| JP | 6952683 B2 | 10/2021 |
| RU | 2402006 C1 | 10/2010 |
| WO | 1985/005446 A1 | 12/1985 |
| WO | 1996/001438 A1 | 1/1996 |
| WO | 1996/012981 A1 | 5/1996 |
| WO | 1996/013615 A1 | 5/1996 |
| WO | 2000/006765 A1 | 2/2000 |
| WO | 2000/052195 A1 | 8/2000 |
| WO | 2000/055572 A1 | 9/2000 |
| WO | 2003/081525 A1 | 2/2003 |
| WO | 2003/056327 A1 | 7/2003 |
| WO | 2003/065358 A2 | 8/2003 |
| WO | 2003/073365 A1 | 9/2003 |
| WO | 2004/020112 A1 | 3/2004 |
| WO | 2004/111610 A2 | 12/2004 |
| WO | 2005/121863 A1 | 12/2005 |
| WO | 2006/121266 A1 | 11/2006 |
| WO | 2008/063135 A1 | 5/2008 |
| WO | 2010/036827 A1 | 4/2010 |
| WO | 2010/056740 A1 | 5/2010 |
| WO | 2010/116341 A1 | 10/2010 |
| WO | 2010/126903 A1 | 11/2010 |
| WO | 2010/137543 A1 | 12/2010 |
| WO | 2011/056658 A | 5/2011 |
| WO | 2011/076413 A1 | 6/2011 |
| WO | 2011/123070 A1 | 10/2011 |
| WO | 2011/143075 A2 | 11/2011 |
| WO | 2012/000102 A1 | 1/2012 |
| WO | 2012/029269 A1 | 3/2012 |
| WO | 2012/030313 A1 | 3/2012 |
| WO | 2012/090198 A2 | 5/2012 |
| WO | 2012/154333 A1 | 11/2012 |
| WO | 2013/041951 A1 | 3/2013 |
| WO | 2013/098821 A1 | 7/2013 |
| WO | 2013/102076 A1 | 7/2013 |
| WO | 2014/146063 A2 | 9/2014 |
| WO | 2014/159620 A1 | 10/2014 |
| WO | 2014/188405 A1 | 11/2014 |
| WO | 2015/001553 A1 | 1/2015 |
| WO | 2015/029032 A1 | 3/2015 |
| WO | 2015/089632 A1 | 6/2015 |
| WO | 2016/021311 A1 | 2/2016 |
| WO | 2016/030897 A1 | 3/2016 |
| WO | 2016/203320 A2 | 12/2016 |
| WO | 2017/046799 A1 | 3/2017 |
| WO | 2017/168411 A1 | 10/2017 |
| WO | 2017/195205 A1 | 11/2017 |
| WO | 2017/195208 A1 | 11/2017 |
| WO | 2018/009920 A1 | 1/2018 |
| WO | 2018/102748 A1 | 6/2018 |
| WO | 2019/035084 A1 | 2/2019 |
| WO | 2019/097387 A1 | 5/2019 |
| WO | 2019/102277 A1 | 5/2019 |
| WO | 2019/198094 A1 | 10/2019 |
| WO | 2021/079305 A1 | 4/2021 |
| WO | 2021/079306 A1 | 4/2021 |
| WO | 2021/116962 A1 | 6/2021 |
| WO | 2022/009104 A2 | 1/2022 |

OTHER PUBLICATIONS

Office Action dated Dec. 21, 2023 which issued during the prosecution of Brazilian Application No. 112018072627-3.
Office Action dated Jan. 9, 2024 which issued during the prosecution of U.S. Appl. No. 18/203,109.
Notice of Allowance issued for U.S. Appl. No. 16/763,810 on Feb. 8, 2024.
A Final Office Action dated Feb. 29, 2024 which issued during the prosecution of U.S. Appl. No. 17/083,647.
An Office Action dated Mar. 4, 2024 which issued during the prosecution of Canadian Application No. 3,022,770.
An Office Action dated Jan. 12, 2023 which issued during the prosecution of Canadian Application No. 3,022,770.
International Search Report and Written Opinion for PCT Application No. PCT/IB2023/062469 mailed on Mar. 11, 2024.
An Office Action dated Mar. 6, 2024 which issued during the prosecution of Canadian Application No. 3,160,688.
An Office Action dated Mar. 11, 2024 which issued during the prosecution of Canadian Application No. 3,160,692.
An Office Action dated Mar. 22, 2024 which issued during the prosecution of U.S. Appl. No. 17/360,503.
An Office Action dated Apr. 3, 2024 which issued during the prosecution of Canadian Application No. 3,160,697.
An Office Action dated Apr. 19, 2024 which issued during the prosecution of Canadian Application No. 3,155,820.
Examination Report dated Apr. 23, 2024 which issued during the prosecution of New Zealand Application No. 787743.
Examination Report dated Apr. 24, 2024 which issued during the prosecution of New Zealand Application No. 787745.
A European Examination Report dated Apr. 29, 2024. which issued during the prosecution of Application No. 20 800 326.9.
A European Examination Report dated May 6, 2024. which issued during the prosecution of Application No. 20 800 325.1.
A Restriction Requirement dated May 7, 2024 which issued during the prosecution of U.S. Appl. No. 17/770,339.
A European Examination Report dated May 8, 2024, which issued during the prosecution of Application No. 20 828 314.3.
Kerem Delikoyun, et al., "2 Deep learning-based cellular image analysis for intelligent medical diagnosis", De Gruyter, 2021 (4 pages) https://www.degruyter.com/document/doi/10.1515/9783110668322-002/html.
C.Briggs, et al., "ICSH guidelines for the evaluation of blood cell analysers including those used for differential leucocyte and reticulocyte counting", International Journal of Laboratory Hematology, 2014, vol. 36, pp. 613-627 (15 pages).
An Office Action dated May 16, 2024 which issued during the prosecution of U.S. Appl. No. 17/063,320.
Notice of Allowance issued for Canadian Application No. 3,155,821 on May 21, 2024.
An Office Action dated May 29, 2024 which issued during the prosecution of Korean Application No. 10-2022-7017082.
An Office Action dated May 29, 2024 which issued during the prosecution of Korean Application No. 10-2022-7017081.
A Chinese Office Action dated May 9, 2024 which issued during the prosecution of Application No. 202080085933.9.
An Office Action dated Aug. 25, 2023 which issued during the prosecution of Canadian Application No. 3,160,702.
An Office Action mailed on Jul. 3, 2023 which issued during the prosecution of U.S. Appl. No. 17/568,858.
An Office Action dated Jul. 12, 2023 which issued during the prosecution of Canadian Application No. 3,155,820.
An Office Action dated Jul. 17, 2023 which issued during the prosecution of Canadian Application No. 3,155,821.
A Chinese Office Action and dated May 22, 2020. which issued during the prosecution of Chinese Application No. 201680053431.1.
An Office Action dated May 30, 2023 which issued during the prosecution of U.S. Appl. No. 17/082,615.
A Hearing Notice issued by the Indian Patent Office on Aug. 29, 2023 for IN 201817012117.
A Hearing Notice issued by the Indian Patent Office on Sep. 1, 2023 for IN 201817036130.

(56) References Cited

OTHER PUBLICATIONS

An Office Action dated Sep. 14, 2023 which issued during the prosecution of U.S. Appl. No. 17/083,647.
An Office Action dated Sep. 14, 2023 which issued during the prosecution of U.S. Appl. No. 17/063,320.
A Summons to an Oral Hearing issued by the European Patent Office on Oct. 5, 2023 for Application No. 17728277.9.
A Decision to Refuse issued on Oct. 3, 2023 for Japanese Patent Application No. 2021-157849.
An Office Action dated Oct. 13, 2023 which issued during the prosecution of Canadian Application No. 2,998,829.
Notice of Allowance dated Oct. 12, 2023 which issued during the prosecution of U.S. Appl. No. 17/568,858.
An Office Action dated Oct. 17, 2023 which issued during the prosecution of U.S. Appl. No. 17/082,615.
A Hearing Notice issued by the Indian Patent Office on Nov. 9, 2023 for IN 201817040226.
Office Action dated Dec. 7, 2023 which issued during the prosecution of Canadian Application No. 3,081,669.
Bovik, Alan C., et. "The Essential Guide to Image Processing", Chapter 27, "Computer Assisted Microscopy", pp. 777-831; Academic Press, 2009 (Merchant).
An Office Action dated Oct. 3, 2022 which issued during the prosecution of U.S. Appl. No. 16/763,810.
An Office Action dated May 6, 2022 which issued during the prosecution of U.S. Appl. No. 16/763,810.
An International Search Report and Written Opinion in International Application No. PCT/IB2018/058861, issued on Apr. 8, 2019.
A European Examination Report dated Apr. 6, 2020 which issued during the prosecution of Applicants European App No. 17726036.1.
A European Examination Report dated Apr. 8, 2020 which issued during the prosecution of Applicants European App No. 17717000.8.
A European Examination Report dated Sep. 3, 2019 which issued during the prosecution of Applicants European App No. 17717000.8.
Agero, U., Mesquita, L.G., Neves, B.R.A., Gazzinelli, R.T. and Mesquita, O.N., 2004, Defocusing microscopy, Microscopy research and technique, 65(3), pp. 159-165.
Ahirwar, Neetu et al., "Advanced Image Analysis Based System for Automatic Detection and Classification of Malarial Parasite in Blood Images", International Journal of Information Technology and Knowledge Management Jan.-Jun. 2012, vol. 5, No. 1, pp. 59-64, Serial Publications Pvt. Ltd, India.
A. K. Sawhney et al., Erythrocyte Alterations Induced by Malathion in Channa punctatus (Bloch), Bull. Environ. Contam. Toxicol, 2000, vol. 64, pp. 398-405 (9 pages total).
An International Search Report and a Written Opinion both dated Jan. 23, 2017 which issued during the prosecution of Applicants PCT/IL2016/051025.
An International Search Report and Written Opinion, dated Aug. 30, 2017 from the International Bureau in counterpart International application No. PCT/IL2017/050526.
An International Search Report and Written Opinion, dated Aug. 8, 2017 from the International Bureau in counterpart International application No. PCT/IL2017/050523.
An International Search Report and Written Opinion, dated May 18, 2017 from the International Bureau in counterpart International application No. PCT/IL2017/050363.
Anand, A., et al. "Automatic Identification of Malaria-Infected RBC with Digital Holographic Microscopy Using Correlation Algorithms." Photonics Journal, IEEE 4.5 (2012): 1456-1464.
Bacus, J.W., 1985, Cytometric approaches to red blood cells, Pure and Applied AL Chemistry, 57(4), pp. 593-598.
Biéler, Sylvain et al. "Improved detection of Trypanosoma brucei by lysis of red blood cells, concentration and LED fluorescence microscopy"; Acta Tropica; vol. 121, Issue 2, Feb. 2012, pp. 135-140.
"Blood specimens:Microscopic Examination", Centers for Disease Control and Prevention CDC, Diagnostic Procedures, 2009, <http://www.dpd.cdc.gov/dpdx/HTML/Frames/DiagnosticProcedures/body_dp_bloodexamin.htm>.
Centers for Disease Control and Prevention, DPDx—Laboratory Identification of Parasitic Diseases of Public Health Concern <http://www.cdc.gov/dpdx/diagnosticProcedures/blood/microexam.html>, Nov. 29, 2013, 4 pages.
Bravo-Zanoguera, M.E., Laris, C.A., Nguyen, L.K., Oliva, M. and Price, J.H., 2007, Dynamic autofocus for continuous-scanning time-delay-and-integration image acquisition in automated microscopy, Journal of biomedical optics, 12(3), pp. 034011-034011.
Brenner et al., An Automated Microscope for Cytologic Research a Preliminary Evaluation, The Journal of Histochecmistry and Cytochemistry, vol. 24, No. 1, pp. 100-111, 1976.
Briggs, C., et al., "Continuing developments with the automated platelet count", Blackwell Publishing Ltd, International Journal of Laboratory Hematology, Jan. 18, 2007, pp. 77-91, vol. 29 (15 pages total).
Cervantes, Serena, Jacques Prudhomme, David Carter, Krishna G Gopi, Qian Li, Young-Tae Chang, and Karine G Le Roch, High-content live cell imaging with RNA probes: advancements in high-throughput antimalarial drug discovery, BMC Cell Biology 2009, 10:45, https://bmcmolcellbiol.biomedcentral.com/track/pdf/10.1186/1471-2121-10-45, (Jun. 10, 2009), 9 pages.
Chiodini, P.L. et al., "Rapid diagnosis of malaria by fluorescence microscopy", The Lancet, vol. 337, Issue 8741, pp. 624-625, Mar. 9, 1991.
Chong, Shau Poh, Shilpa Pant, and Nanguang Chen, "Line-scan Focal Modulation Microscopy for Rapid Imaging of Thick Biological Specimens", SPIE/OSA/IEEE Asia Communications and Photonics, International Society for Optics and Photonics, 2011, 5 pages.
Emma Eriksson et al: "Automated focusing of nuclei for time lapse experiments on single cells using holographic optical tweezers", Optics Express, vol. 17, No. 7, Mar. 24, 2009, pp. 5585-5594.
F. Boray Tek et al. "Parasite detection and identification for automated thin blood film malaria diagnosis", Computer Vision and Image Understanding, vol. 114, Issue 1, Jan. 2010, pp. 21-32.
Frean, John. "Microscopic Determination of Malaria Parasite Load: Role of Image Analysis", Microscopy: Science, technology, Applications, and Education, (2010), pp. 862-866.
Gallo, V., Skorokhod, O.A., Schwarzer, E, and Arese, P. "Simultaneous determination of phagocytosis of Plasmodium falciparum-parasitized and non-parasitized red blood cells by flow cytometry", Malaria Journal 2012, 11:428, 11 pages.
Garcia, et al. "Laboratory Diagnosis of Blood-borne Parasitic Diseases; Approved Guideline", NCCLS Documents M115-a, Jun. 2000, 13 pages.
Gordon, Andrew et al. Supplementary Note to Gordon et al: "Single-cell quantification of molecules" Nature Methods, Jan. 21, 2007, pp. 1-35.
Gordon, Andrew et al., "Single-cell quantification of molecules", Nature Methods 4, Jan. 21, 2007, pp. 175-181.
Groen, F.C.A., et al. "A comparison of different focus functions for use in autofocus algorithms", Cytometry, Alan Liss, New York, US, vol. 6, No. 2, Mar. 1, 1985 (Mar. 1, 1985) pp. 81-91.
Guy, Rebecca, Paul Liu, Peter Pennefather and Ian Crandall, "The use of fluorescence enhancement to improve the microscopic diagnosis of falciparum malaria", Malaria Journal 2007 6:89, https://malariajournal.biomedcentral.com/articles/10.1186/1475-2875-6-89, (Jul. 9, 2007), 8 pages.
Houri-Yafin, A., et al. "An enhanced computer vision platform for clinical diagnosis of malaria" Malaria Control and Elimination, 2016, p. 138, Vo. 5, Issue 1, omics International, India, 5 pages.
Jager et al. "Five-minute Giemsa stain for rapid detection of malaria parasites in blood smears", Tropical Doctor, Vo. 41, pp. 33-35, Jan. 2011.
Jahanmehr,S A H et al., "Simple Technique for Fluorescence Staining of Blood Cells with Acridine Orange", Journal of Clinical Pathology, Feb. 12, 1987, pp. 926-929 (4 pages total).
Joanny, Fanny, Held Jana, and Benjamin Mordmullera, "In Vitro Activity of Fluorescent Dyes against Asexual Blood Stages of

(56) References Cited

OTHER PUBLICATIONS

Plasmodium falciparum", DOI: 10.1128/AAC.00709-12, vol. 56, No. 11, Nov. 2012, pp. 5982-5985.

Kawamoto, F. and P.F.Billingsley, "Rapid diagnosis of malaria by fluorescence microscopy", Parasitology Today, 8.2 (1992): pp. 69-71.

Kawamoto,F. "Rapid diagnosis of malaria by fluorescence microscopy with light microscope and interference filter", The Lancet, vol. 337, pp. 200-202, Jan. 26, 1991.

Keiser, J. et al., "Acridine Orange for malaria diagnosis: its diagnostic performance, its promotion and implementation in Tanzania, and the implications for malaria control", Annals of Tropical Medicine and parasitology, 96.7, (2002), pp. 643-654.

Knesel, "Roche Image Analysis Systems, Inc.", Acta Cytologica, vol. 40, pp. 60-66, (1996).

Kumar, Amit et al. "Enhanced Identification of Malarial Infected Objects using Otsu Algorithm from Thin Smear Digital Images", International Journal of Latest Research in Science and Technology, vol. 1, Issue 2, pp. 159-163, Jul.-Aug. 2012.

Le, Minh-Tam et al., "A novel semi-automatic image processing approach to determine Plasmodium falciparum parasitemia in Giemsa-stained thin blood smears", BMC Cell Biology, published Mar. 28, 2008, 12 pages.

Leif, "Methods for Preparing Sorted Cells as Monolayer Specimens", Springer Lab Manuals, Section 7—Chapter 5, pp. 592-619, (2000).

Life Technologies Corporation, "Counting blood cells with Countless Automated Cell Counter" found at http://www.lifetechnologies.com/content/dam/LifeTech/migration/files/cell-tissue-analysis/pdfs.par.83996.file.dat/w-082149-countless-application-blood-cells.pdf, 4 pages, (2009).

An International Search Report and Written Opinion for PCT Application No. PCT/IB2020/061732 mailed on May 7, 2021.

Matcher, S.J., et al. "Use of the water absorption spectrum to quantify tissue chromophore concentration changes in near-infrared spectroscopy", Physics in Medicine & Biology, vol. 39, No. 1, 1994 pp. 177-196, IOP Publishing Ltd., UK.

Mendiratta, D.K. et al. Evaluation of different methods for diagnosis of p. falciparum malaria; Indian J Med Microbiol. Jan. 24, 2006, (1), pp. 49-51.

Merchant et al, "The Essential Guide to Image Processing", Chapter 27, Computer Assisted Microscopy, pp. 777-831; Academic Press, 2009.

Moody , "Rapid Diagnostic Tests for Malaria Parasites", Clinical Microbiology Reviews, vol. 15, No. 1, pp. 66-78, 12 (2002).

Moon S, Lee S, Kim H, Freitas-Junior LH, Kang M, Ayong L, et al. (2013) An Image Analysis Algorithm for Malaria Parasite Stage Classification and Viability Quantification, PLoS ONE 8(4): e61812. https://doi.org/10.1371/journal.pone.0061812, 12 pages.

Notice of Allowance dated Mar. 2, 2020, which issued during the prosecution of U.S. Appl. No. 16/657,473.

Ortyn, William E., et al. "Extended Depth of Field Imaging for High Speed Cell Analysis", Cytometry Part A 71.4, 2007), pp. 215-231.

Osibote, O. A., et al. "Automated focusing in bright-field microscopy for tuberculosis detection", Journal of Microscopy 240.2 (2010), pp. 155-163.

Pasini, Erica M. et al. "A novel live-dead staining methodology to study malaria parasite viability", Malaria Journal 2013, 12:190, 10 pages.

Piruska, Aigars et al., "The autofluorescence of plastic materials and chips measured under laser irradiation" Lab on a Chip, 2005, 5, pp. 1348-1354, published Nov. 1, 2005.

Poon et al., "Automated Image Detection and Segmentation in Blood Smears", Cytometry, 1992, 13, pp. 766-774.

Price Jeffrey H. and David A. Gough, "Comparison of phase-contrast and fluorescence digital autofocus for scanning microscopy", Cytometry 16.4 (1994), pp. 283-297.

Purwar, Yashasvi, et al. "Automated and Unsupervised Detection of Malarial Parasites in Microscopic Images", Malaria Journal, 10.1, 364, (2011), 10 pages.

Rappaz, Benjamin et al., "Comparative study of human erythrocytes by digital holographic microscopy, confocal microscopy, and impedance volume analyzer", Cytometry Part A, 2008, vol. 73, Issue 10, pp. 895-903, John Wiley & Sons, US.

Roma, P. M. S., et al . "Total three-dimensional imaging of phase objects using defocusing microscopy: Application to red blood cells", Applied Physics Letters 104,25 (2014): 251107, 7 pages.

Ross, Nichoals E., et al., "Automated image processing method for the diagnosis and classification of malaria on thin blood smears", Medical and Biological Engineering and Computing, May 2006, vol. 44, Issue 5, pp. 427-436, Springer Publishing Company, US.

Sheikh , H., Bin Zhu, Micheli-Tzanakou, E. (1996) "Blood cell identification using neural networks", Proceedings of the IEEE 22nd Annual Northeast Bioengineering Conference, pp. 119-120.

Shen, Feimo, Louis Hodgson and Klaus Hahn, "Digital autofocus method for automated microscopy", Methods in Enzymology, vol. 414, 2006, pp. 620-632.

Shute G. T. and T. M. Sodeman, "Identification of malaria parasites by fluorescence microscopy and acridine orange staining", Bulletin of the World Health Organ, 1973; 48(5), pp. 591-596.

Sun,Yu, S. Duthaler and B.J. Nelson, "Autofocusing algorithm selection in computer microscopy", 2005 IEEE/RSJ International Conference on Intelligent Robots and Systems, 7 pages.

Tek, F. Boray, Andrew G. Dempster, and Izzet Kale, "Computer Vision for Microscopy Diagnosis of Malaria", Malaria Journal 8.1, (2009): 153, 14 pages.

Thung, Ferdian, and Iping Supriana Suwardi, "Blood Parasite Identification Using Feature Based Recognition", Electrical Engineering and Informatics (ICEEI), 2011 International Conference on IEEE, 2011, 7 pages.

UNITAID Malaria Diagnostic Technology And Market Landscape, 2nd Edition (2014), 148 pages.

Vink, J.P. et al., "An automatic vision-based malaria diagnosis system", Journal of Microscopy 250.3 (2013), pp. 166-178.

Wissing, Frank et al. "Illumination of the Malaria Parasite Plasmodium falciparum AltersIntracellular pH", Implications for Live Cell Imaging; published Jul. 24, 2002,JBS Papers in Press, vol. 277 No. 40, pp. 27747-37755.

Wright, J H. A Rapid Method for the Differential Staining of Blood Films and Malarial Parasites Journal of medical research, vol. 7,1, (1902): pp. 138-144.

Wu, Caicai et al., "Feasibility study of the spectroscopic measurement of oxyhemoglobin using whole blood without pre-treatment", The Analyst, Mar. 1998, pp. 477-481, vol. 123 (5 pages total).

Wu, Qiang, Fatima Mechant, and Kenneth Castleman, Microscope Image Processing. Chapter 16, Autofocusing, pp. 441-467, Academic Press, 2010.

Xu, Lili, Asok Chaudhuri, "Plasmodium yoelii: A differential fluorescent technique using Acridine Orange to identify infected erythrocytes and reticulocytes in Duffy knockout mouse", Experimental Parasitology, vol. 110, Issue 1, May 2005, pp. 80-87, https://www.sciencedirect.com/science/article/pii/S001448940500038X, (May 31, 2005).

Yang, Ming, and Li Luo, "A Rapid Auto-Focus Method in Automatic Microscope", Signal Processing, 2008. ICSP 2008. 9th International Conference on IEEE, 2008, pp. 502-505.

Yao, LN et al. "Pathogen identification and clinical diagnosis for one case infected with Babesia". Chinese journal of parasitology parasitic diseases, Aug. 2012, pp. 118-121.

An Extended European Search Report issued for European Patent Application No. 21164814.2 on Jun. 9, 2021.

Third Office Action dated Jul. 12, 2021 which issued during the prosecution of Chinese Patent Application No. 201680053431.1.

Non-Final Office Action dated Jul. 27, 2021, which issued during the prosecution of U.S. Appl. No. 16/851,686.

Non-Final Office Action dated Aug. 19, 2021, which issued during the prosecution of U.S. Appl. No. 16/098,893.

Non-Final Office Action dated Sep. 1, 2021 which issued during the prosecution of U.S. Appl. No. 16/088,321.

First Office Action dated Aug. 4, 2021 which issued during the prosecution of Chinese Patent Application No. 201780027908.3.

An Examination Report dated Mar. 4, 2021 which issued during the prosecution of Indian Patent Application No. 201817036130.

(56) References Cited

OTHER PUBLICATIONS

An Examination Report dated May 5, 2021 which issued during the prosecution of Indian Patent Application No. 201817012117.
Notice of Allowance dated Aug. 3, 2021, which issued during the prosecution of U.S. Appl. No. 16/851,410.
An International Search Report and Written Opinion for Application No. PCT/IB2020/061731 issued on Feb. 22, 2021.
Invitation to pay fees and Partial Search Report issued for PCT Application No. PCT/IB2020/061732 on Mar. 10, 2021.
Invitation to pay fees and Partial Search Report issued for PCT Application No. PCT/IB2020/061736 on Mar. 12, 2021.
Invitation to pay fees and Partial Search Report issued for PCT Application No. PCT/IB2020/061728 on Mar. 15, 2021.
International Search Report issued for PCT Application No. PCT/IB2020/061724 on Mar. 18, 2021.
International Search Report and Written Opinion for PCT Application No. PCT/IB2020/061728 mailed on May 7, 2021.
International Search Report and Written Opinion for PCT Application No. PCT/IB2020/061736 mailed on May 3, 2021.
Non-Final Office Action dated Jun. 17, 2021 which issued during the prosecution of U.S. Appl. No. 16/851,410.
A Final Office Action dated Jun. 17, 2021 which issued during the prosecution of U.S. Appl. No. 16/088,321.
Notice of Allowance dated May 19, 2021 which issued during the prosecution of U.S. Appl. No. 16/099,270.
A Restriction Requirement issued by the USPTO on Oct. 19, 2020 for U.S. Appl. No. 16/099,270.
Non-Final Office Action dated Oct. 6, 2021, which issued during the prosecution of U.S. Appl. No. 17/063,320.
Notice of Allowance dated Jan. 21, 2022, which issued during the prosecution of U.S. Appl. No. 16/098,893.
An Office Action dated Mar. 3, 2022, which issued during the prosecution of U.S. Appl. No. 17/063,320.
An Office Action dated Nov. 25, 2022 which issued during the prosecution of U.S. Appl. No. 17/082,483.
An Office Action dated Jul. 12, 2022, which issued during the prosecution of U.S. Appl. No. 16/088,321.
An Office Action dated Aug. 2, 2022, which issued during the prosecution of Japanese Patent Application No. 2021-145455.
An Examination Report dated Aug. 25, 2022, which issued during the prosecution of Australian Patent Application No. 2017263807.
An Office Action dated Aug. 30, 2022 which issued during the prosecution of Japanese Patent Application No. 2020-526176.
An Office Action dated Sep. 13, 2022, which issued during the prosecution of Japanese Patent Application No. 2021-157849.
Hideto Miura, "How to regard as how to consider the poikilocyte in urine an erroneous decision factor", Modern Medical Laboratory, Sep. 1, 2002, vol. 30, No. 9, pp. 862-864 (6 pages total).
Jun Hashimoto, "Morphological Studies of Urinary Red Blood Cells in Renal and Urinary Tract Disorders (II) Use of Wright's Stain in Differential Diagnosis between Renal and Urinary Tract Disorders" Kawasaki Medical Congress Magazine, Mar. 1989, vol. 15, No. 1, pp. 94-101 (9 pages total).
D F Birch et al., "The research on the differential diagnosis of the kidney urinary tract obstacle by glomerular or non-glomerular", Lancet, Oct. 20, 1979, vol. 2, No. 8147, pp. 845-846 (3 pages total).
A First Examination Report dated Sep. 19, 2022, which issued during the prosecution of Indian Patent Application No. 201817040226.
An Office Action dated Oct. 5, 2022 which issued during the prosecution of Brazilian Application No. 112018005099-7.
An Office Action dated Nov. 25, 2022 which issued during the prosecution of Brazilian Application No. 122020017765-9.
An Office Action dated Dec. 9, 2022 which issued during the prosecution of U.S. Appl. No. 17/083,647.
An Office Action dated Dec. 28, 2022 which issued during the prosecution of Russian Patent Application No. 2022112399.
An Office Action dated Dec. 28, 2022 which issued during the prosecution of Russian Patent Application No. 2022112393.
An Office Action dated Jan. 6, 2023 which issued during the prosecution of U.S. Appl. No. 17/063,320.
An Office Action dated Sep. 2, 2022 which issued during the prosecution of U.S. Appl. No. 17/063,320.
An Office Action dated Jan. 5, 2023 which issued during the prosecution of Chinese Patent Application No. 201880079888.9.
An Office Action dated Jan. 19, 2023 which issued during the prosecution of U.S. Appl. No. 17/490,767.
An Examination Report dated Jan. 23, 2023, which issued during the prosecution of Australian Patent Application No. 2022200112.
Yazdanfar, S., Kenny, K.B., Tasimi, K., Corwin, A.D., Dixon, E.L. and Filkins, R.J., 2008, Simple and robust image-based autofocusing for digital microscopy, Optics express, 16(12), pp. 8670-8677.
Zahniser et al., Automated Slide Preparation System for the Clinical Laboratory, Cytometry, vol. 26, No. 10, pp. 60-64, (1996).
An Office Action dated Mar. 2, 2023 which issued during the prosecution of Canadian Application No. 3,018,536.
An Office Action dated Feb. 22, 2023 which issued during the prosecution of Canadian Application No. 3,081,669.
An Office Action dated Mar. 3, 2023 which issued during the prosecution of U.S. Appl. No. 17/082,483.
An Office Action dated Mar. 7, 2023 which issued during the prosecution of Japanese Application No. JP 2021-157849.
Taihei Takakusaki, "Shape Change of Red Cell Ghost and ATP", The Kitakanto Medical Journal, 1960, vol. 10, Issue 4, pp. 522-531 (11 pages total).
Olga V. Tyulina et al., "Erythrocyte and plasma protein modification in alcoholism: A possible role of acetaldehyde", Biochimica et Biophyisca, 2006, vol. 1762, pp. 558-563 (7 pages total).
Masafumi Onodera, "Organ Derangement", Medicina, Sep. 9, 2005, vol. 42, No. 9, pp. 1582-1584 (6 pages total).
Tetsuya Hirota et al., Kusanon A® Poisoning Complicated by Heinz Body Hemolytic Anemia, Japanese Association for Acute Medicine Magazine, vol. 12, No. 12, Dec. 15, 2001, pp. 749-754 (1 page total).
An Office Action dated Mar. 17, 2023 which issued during the prosecution of U.S. Appl. No. 17/083,647.
An Extended European Search Report which issued on Mar. 20, 2023 for Application No. 22209948.3.
An Office Action dated Mar. 27, 2023 which issued during the prosecution of U.S. Appl. No. 16/763,810.
An Office Action dated Mar. 27, 2023 which issued during the prosecution of Brazilian Application No. 122020017765-9.
Notice of Allowance issued for U.S. Appl. No. 16/088,321 on Apr. 12, 2023.
An Office Action dated Jun. 8, 2023 which issued during the prosecution of Canadian Application No. 3,160,692.
An Office Action dated Jun. 9, 2023 which issued during the prosecution of Canadian Application No. 3,160,688.
An Office Action dated Jun. 22, 2023 which issued during the prosecution of Canadian Application No. 3,160,697.
Notice of Allowance dated Nov. 5, 2021, which issued during the prosecution of U.S. Appl. No. 16/851,410.
A European Examination Report issued for European Patent Application No. 17728277.9 on Dec. 23, 2021.
A European Examination Report dated Dec. 9, 2019 which issued during the prosecution of Applicants European App No. 16782094.3.
A European Examination Report dated Feb. 1, 2019 which issued during the prosecution of Applicants European App No. 17717000.8.
A European Examination Report dated Feb. 11, 2020 which issued during the prosecution of Applicants European App No. 17728277.9.
Notice of Allowance dated May 15, 2023 which issued during the prosecution of U.S. Appl. No. 17/490,767.
An Examination Report dated Aug. 16, 2023, which issued during the prosecution of Australian Patent Application No. 2018369859.
A Japanese Office Action dated Mar. 30, 2021 which issued during the prosecution of Application No. 2018/558180.
A Non-Final Office Action dated May 26, 2022 which issued during the prosecution of U.S. Appl. No. 17/083,775.
A Restriction Requirement issued by the USPTO on Aug. 24, 2020 for U.S. Appl. No. 16/088,321.

(56) References Cited

OTHER PUBLICATIONS

An Examination Report dated Jun. 28, 2022, which issued during the prosecution of Indian Patent Application No. 202047019700.
An Examination Report issued on Apr. 29, 2021 for Australian Patent Application No. 2016322966.
An Examination Report issued on Dec. 7, 2020 for Australian Patent Application No. 2016322966.
An Office Action dated Feb. 16, 2022 which issued during the prosecution of U.S. Appl. No. 16/088,321.
An Office Action dated Aug. 24, 2020 for U.S. Appl. No. 16/098,893.
An Office Action dated Dec. 8, 2020 for Japanese Patent Application No. 2018/512961.
An Office Action dated Jan. 11, 2021 for U.S. Appl. No. 16/098,893.
An Office Action dated Jan. 29, 2021 for U.S. Appl. No. 16/099,270.
An Office Action dated Mar. 9, 2021 for U.S. Appl. No. 16/088,321.
An Office Action dated May 31, 2022 which issued during the prosecution of U.S. Appl. No. 17/083,659.
An Office Action dated Oct. 25, 2022 which issued during the prosecution of Canadian Application No. 2,998,829.
Ben-Suliman-2018-Computerized Counting-Based System for Acute Lymphoblastic Leukemia Detection in Microscopic Blood Images: 27th International Conference on Artificial Neural Networks, Rhodes, Greece, Oct. 4-7, 2018, Proceedings, Part II.
Fohlen-Walter, Anne PhD, et al., "Laboratory Identification of Cryoglobulinemia From Automated Blood Cell Counts, Fresh Blood Samples, and Blood Films", American Society for Clinical Pathology, Am J Clin Pathol, 2002, pp. 606-614, vol. 117 (9 pages total).
Hiremath, P.S,. et al., "Automated Identification and Classification of White Blood Cells (Leukocytes) in Digital Microscopic Images", IJCA Special Issue on "Recent Trends in Image Processing and Pattern Recognition" RTIPPR, 2010.
International Search Report issued for PCT Application No. PCT/IB2020/059924 on Mar. 22, 2021.
International Search Report issued for PCT Application No. PCT/IB2020/059925 on Mar. 26, 2021.
Invitation to pay fees and Partial Search Report issued for PCT Application No. PCT/IB2020/059924 on Jan. 28, 2021.
Invitation to pay fees and Partial Search Report issued for PCT Application No. PCT/IB2020/059925 on Feb. 4, 2021.
Notice of Allowance dated Nov. 10, 2021, which issued during the prosecution of U.S. Appl. No. 16/851,686.
Omucheni et al. "Application of principal component analysis to multispectral-multimodal optical image analysis for malaria diagnostics", Malaria Journal 2014, 13:485 http://www.malariajournal.com/content/13/1/485.
Putzu, et al., "Leucocyte classification for leukaemia detection using image processing techniques.", Artificial Intelligence in Medicine, vol. 63, No. 3, Nov. 1, 2014.
Ran, Qiong et al. "Spatial-spectral blood cell classification with microscopic hyperspectral imagery", Proc. SPIE 10461, AOPC 2017: Optical Spectroscopy and Imaging, 1046102 (Oct. 24, 2017).
Saraswat, et al. "Automated microscopic image analysis for leukocytes identification: A survey", ABV-Indian Institute of Information Technology and Management, Gwalior, India, Micron, 2014, vol. 65, pp. 20-33.
Supplemental Notice of Allowance dated Nov. 12, 2021, which issued during the prosecution of U.S. Appl. No. 16/851,686.
Varga, et al., "An automated scoring procedure for the micronucleus test by image analysis", Mutagenesis vol. 19 No. 5 pp. 391-397, 2004.
Witt, et al. "Establishing traceability of photometric absorbance values for accurate measurements of the haemoglobin concentration in blood.",Metrologia 50 (2013) 539-548.
Second Notice of Allowance issued Aug. 23, 2023 in U.S. Appl. No. 17/490,767.
A Chinese Office Action dated May 23, 2024 which issued during the prosecution of Application No. 202080073623.5.
A Chinese Office Action dated May 23, 2024 which issued during the prosecution of Application No. 202080073583.4.
A Japanese Office Action dated Jul. 1, 2024 which issued during the prosecution of Application No. 2022-521112.
A Japanese Office Action dated Jul. 3, 2024 which issued during the prosecution of Application No. 2022-521238.
Notice of Allowance issued for U.S. Appl. No. 18/203,109 on Jun. 13, 2024.
Horton, A. P., K. Kumar, H. Liu, L. Cheng, N. Lane, E. Taylor, H. R. Garner, J. W. Uhr, and X. J. Zhang. "Quantitative immunophenotyping of circulating tumor cells in blood using microfluidic screening chip integrated with hyperspectral microscope." In Transducers 2009-2009 International Solid-State Sensors, Actuators and Microsystems Conference, pp. 77-80. IEEE, 2009. (4 pages).
Niehues T, Kapaun P, Harms DO, Burdach S, Kramm C, Körholz D, Janka-Schaub G, Göbel U. "A classification based on T cell selection-related phenotypes identifies a subgroup of childhood T-ALL with favorable outcome in the COALL studies." Leukemia. Apr. 1999; vol. 13 (4 pages).
Bonnekoh, Bernd, et al. "Profiling lymphocyte subpopulations in peripheral blood under efalizumab treatment of psoriasis by multi epitope ligand cartography (MELC) robot microscopy", European Journal of Dermatology, 2006, vol. 16, Issue 6, 3 pages total.
An Office Action dated Aug. 15, 2024 which issued during the prosecution of U.S. Appl. No. 17/083,647.
Notice of Allowance dated Aug. 7, 2024, which issued during the prosecution of U.S. Appl. No. 17/783,924.
An Office Action dated Sep. 3, 2024 which issued during the prosecution of Canadian Patent Application No. 3,081,669.
A combined Search and Examination Report issued for EP 20828313.5 on Sep. 11, 2024.
Notice of Allowance dated Sep. 23, 2024, which issued during the prosecution of U.S. Appl. No. 18/203,109.

\* cited by examiner

SAMPLE CARRIER FOR MICROSCOPY AND OPTICAL DENSITY MEASUREMENTS

CROSS-REFERENCE TO RELATED APPLICATIONS

The present application is a continuation of U.S. Ser. No. 16/763,810 to Yorav-Raphael (published as US 2020/0386976), which is the US national phase application of PCT Application No. PCT/IB2018/058861 to Yorav-Raphael (published as WO 19/097387), filed Nov. 12, 2018, which claims priority from U.S. Provisional Patent Application No. 62/585,621 to Yorav-Raphael, filed Nov. 14, 2017, entitled "Sample carrier for optical measurements."

The above-referenced application is incorporated herein by reference.

FIELD OF EMBODIMENTS OF THE INVENTION

Some applications of the presently disclosed subject matter relate generally to sample carriers that are used for optical measurements, and in particular, to sample carriers that are used for microscopic measurements that are performed upon bodily samples.

BACKGROUND

In some optics-based methods (e.g., diagnostic, and/or analytic methods), a property of a biological sample, such as a blood sample, is determined by performing an optical measurement. For example, the density of a component (e.g., a count of the component per unit volume) may be determined by counting the component within a microscopic image. Similarly, the concentration and/or density of a component may be measured by performing optical absorption, transmittance, fluorescence, and/or luminescence measurements upon the sample. Typically, the sample is placed into a sample carrier and the measurements are performed with respect to a portion of the sample that is contained within a chamber of the sample carrier. The measurements that are performed upon the portion of the sample that is contained within the chamber of the sample carrier are analyzed in order to determine a property of the sample.

For some applications, diagnostic tests are performed on a sample carrier that is filled with a bodily sample that is taken from a subject. In such cases, there is a risk that a user will try to reuse the cartridge (e.g. after washing it). This could lead to the risk of erroneous results in diagnosing a subsequent sample that is placed in the sample carrier after is has already been used, e.g. due to cross-contamination, and/or debris being left in the sample carrier from its previous use.

SUMMARY OF EMBODIMENTS

For some applications of the present invention, a sample carrier is configured to house the bodily sample, and at least a portion of the sample carrier is configured to fluoresce, at least under certain conditions. For some applications, the portion of the sample carrier is analyzed, in order to determine whether the portion or an area thereof has undergone photobleaching. In response to detecting that the portion or the area thereof has undergone photobleaching, it is determined that the sample carrier, or a portion thereof (e.g., a chamber thereof) has already been used, and/or the number of times the sample carrier or the portion thereof (e.g., a chamber thereof) has been used. For some applications, the above steps are performed by a computer processor. For some applications, in response to detecting that the sample carrier, or a portion thereof (e.g., a chamber thereof) has already been used, or that the usage of the sample carrier, or a portion thereof (e.g., a chamber thereof) has exceeded a given threshold, the computer processor (a) generates an output indicating that the sample carrier, or the portion thereof (e.g., the chamber thereof), should not be used, (b) generates an output indicating that the sample carrier, or the portion thereof (e.g., the chamber thereof) is contaminated, and/or (c) prevents the optical measurement device from performing optical measurements upon the sample carrier, or the portion thereof (e.g., the chamber thereof).

For some applications, a given area of the sample carrier is marked by photobleaching the area when the sample carrier is used. For example, an optical measurement device may be configured to photobleach a given area of the sample carrier, when the sample carrier is placed inside the optical measurement device, and/or when the optical measurement device performs an optical measurement on the sample carrier. For some applications, the optical measurement is configured to photobleach a given area of the sample carrier automatically, by virtue of performing optical measurements upon the sample carrier. For example, the optical measurement device may be a microscope system that performs fluorescent imaging upon the sample. For some applications, the excitation wavelength that is emitted by the microscope system, in order to cause the sample to fluoresce, also photobleaches the given area of the sample carrier. For some applications, prior to photobleaching the given area, the computer processor verifies that the sample carrier has not already been used, using the techniques described hereinabove.

For some applications, the sample carrier is configured to be reused, but only a limited number of times. For some such applications, each time the sample carrier is used, a respective different area of the sample carrier is photobleached, such that the computer processor may then determine how many times the sample carrier has been used by detecting the number and/or locations of photobleached areas upon the sample carrier.

For some applications, the above-described photobleaching effect is used by a manufacturer of sample carriers to encode manufacturing information regarding the sample carrier, in a manner that is not visible to the naked eye. For example, such information may include an authenticity mark (to reduce the likelihood of counterfeit sample carriers being utilized), sample carrier type, manufacturing date, expiry date, manufacturing location, date required for accurate performance of the test (e.g. calibration date pertaining to the sample carrier, or batch of sample carriers). For some such applications, the mark is marked using a geometric pattern that includes lines, figures, barcodes, alphanumeric characters, etc.

There is therefore provided, in accordance with some applications of the present invention, apparatus for use with a bodily sample, the apparatus including:
  a sample carrier configured to carry a portion of the bodily sample, at least a portion of the sample carrier being configured to fluoresce, at least under certain conditions; and
  an optical measurement device configured to:
    perform optical measurements upon the portion of the bodily sample that is housed within the sample carrier; and at least partially photobleach an area within the portion of the sample carrier by causing the area to fluoresce.

In some applications, the apparatus further includes an optical measurement unit that is configured to house the sample carrier while the optical measurement device performs the optical measurements upon the portion of the bodily sample, and the optical measurement device is configured to photobleach the given area of the sample carrier, in response to the sample carrier being placed inside the optical measurement unit.

In some applications, wherein the sample carrier is configured to be used for a plurality of measurements by the optical measurement device, and wherein the optical measurement device is configured to photobleach a respective different area of the sample carrier, each time the sample carrier is used for measurements by the optical measurement device.

In some applications, the apparatus further includes:
an output device; and
at least one computer processor that is operatively coupled to the optical measurement device, the computer processor being configured:
  to detect that the area within the portion of the sample carrier has been photobleached, and
  in response thereto, to generate an output upon the output device indicating that at least a portion of the sample carrier is contaminated.

In some applications, the computer processor is configured:
  to determine that at least a portion of the sample carrier has been used more than a given number of times, based upon detecting that an area within of the portion of the sample carrier has been photobleached; and
  to generate the output on the output device, in response to determining that at least the portion of the sample carrier has been used more than the given number of times.

In some applications, the apparatus further includes:
an output device; and
at least one computer processor that is operatively coupled to the optical measurement device, the computer processor being configured:
  to detect that the area within the portion of the sample carrier has been photobleached, and
  in response thereto, to generate an output upon the output device indicating that optical measurements cannot be performed on at least a portion of the sample that is housed within a given portion of the sample carrier.

In some applications, the computer processor is configured:
  to determine that at least a portion of the sample carrier has been used more than a given number of times, based upon detecting that an area within of the portion of the sample carrier has been photobleached; and
  to generate the output on the output device, in response to determining that at least the portion of the sample carrier has been used more than the given number of times.

In some applications, the apparatus further includes at least one computer processor that is operatively coupled to the optical measurement device, the computer processor being configured:
  to detect that the area within the portion of the sample carrier has been photobleached, and
  in response thereto, to prevent the optical measurement device from performing optical measurements upon at least a portion of the sample that is housed within a given portion of the sample carrier.

In some applications, wherein the computer processor is configured:
  to determine that at least a portion of the sample carrier has been used more than a given number of times, based upon detecting that an area within of the portion of the sample carrier has been photobleached; and
  to prevent the optical measurement device from performing the optical measurements, in response to determining that at least the portion of the sample carrier has been used more than the given number of times.

In some applications, the optical measurement device is configured to photobleach the given area of the sample carrier by virtue of performing optical measurements upon the sample.

In some applications, the optical measurement device is configured to illuminate the sample, in order to perform optical measurements on the sample, and the optical measurement device is configured to photobleach the given area of the sample carrier by virtue of illuminating the sample.

There is further provided, in accordance with some applications of the present invention, a method for use with a bodily sample, the method including:
  placing a portion of the bodily sample within a sample carrier, at least a portion of the sample carrier being configured to fluoresce, at least under certain conditions; and
  while the portion of the bodily sample is housed within the sample carrier, performing optical measurements upon the portion of the bodily sample that is housed within the sample carrier, using an optical measurement device; and
  at least partially photobleaching an area within the portion of the sample carrier by causing the area to fluoresce.

There is further provided, in accordance with some applications of the present invention, apparatus for use with a bodily sample and an output device, the apparatus including:
  a sample carrier configured to carry the bodily sample, at least a portion of the sample carrier being configured to fluoresce, at least under certain conditions;
  an optical measurement device configured to perform optical measurements upon the portion of the bodily sample that is housed within the sample carrier; and
  at least one computer processor that is operatively coupled to the optical measurement device, the computer processor being configured, in response to detecting that an area within the portion of the sample carrier has been photobleached, to perform an action selected from the group consisting of: generating an output upon the output device indicating that at least a portion of the sample carrier is contaminated, generating an output upon the output device indicating that optical measurements cannot be performed on at least a portion of the sample that is housed within a given portion of the sample carrier, and preventing the optical measurement device from performing optical measurements upon at least a portion of the sample that is housed within a given portion of the sample carrier.

In some applications, the computer processor is configured:
  to determine that at least a portion of the sample carrier has been used more than a given number of times, based upon detecting that an area within of the portion of the sample carrier has been photobleached; and to perform the selected action, in response to determining that at least the portion of the sample carrier has been used more than the given number of times.

There is further provided, in accordance with some applications of the present invention, a method for use with a bodily sample and an output device, the method including:

placing a portion of the bodily sample inside a sample carrier, at least a portion of the sample carrier being configured to fluoresce, at least under certain conditions;

performing optical measurements upon the portion of the bodily sample that is housed within the sample carrier; and using at least one computer processor, in response to detecting that an area within the portion of the sample carrier has been photobleached, performing an action selected from the group consisting of: generating an output upon the output device indicating that at least a portion of the sample carrier is contaminated, generating an output upon the output device indicating that optical measurements cannot be performed on at least a portion of the sample that is housed within a given portion of the sample carrier, and preventing the optical measurement device from performing optical measurements upon at least a portion of the sample that is housed within a given portion of the sample carrier.

There is further provided, in accordance with some applications of the present invention, apparatus for use with a bodily sample and a microscope having an imaging module, the apparatus including:

at least one chamber configured for housing therein a portion of the bodily sample, the chamber including an upper inner surface, and a lower inner surface,
wherein the upper inner surface includes a first mark and the lower inner surface includes a second mark; and
a computer processor configured to:
focus the imaging module on the first marking and register an indication of a first focusing distance between the imaging module and the first marking;
focus the imaging module on the second marking and register an indication of a second focusing distance between the imaging module and the second marking; and
determine a height of the chamber, based upon a difference between the first focusing distance and the second focusing distance.

There is further provided, in accordance with some applications of the present invention, a method for use with a bodily sample and a microscope having an imaging module, the method including:

placing a portion of the bodily sample inside at least one chamber, the chamber including an upper inner surface, and a lower inner surface, the upper inner surface including a first mark and the lower inner surface including a second mark; and
using at least one computer processor:
focusing the imaging module on the first marking and registering an indication of a first focusing distance between the imaging module and the first marking;
focusing the imaging module on the second marking and registering an indication of a second focusing distance between the imaging module and the second marking; and
determining a height of the chamber, based upon a difference between the first focusing distance and the second focusing distance.

The present invention will be more fully understood from the following detailed description of embodiments thereof, taken together with the drawings, in which:

DETAILED DESCRIPTION OF EMBODIMENTS

Figure 1:
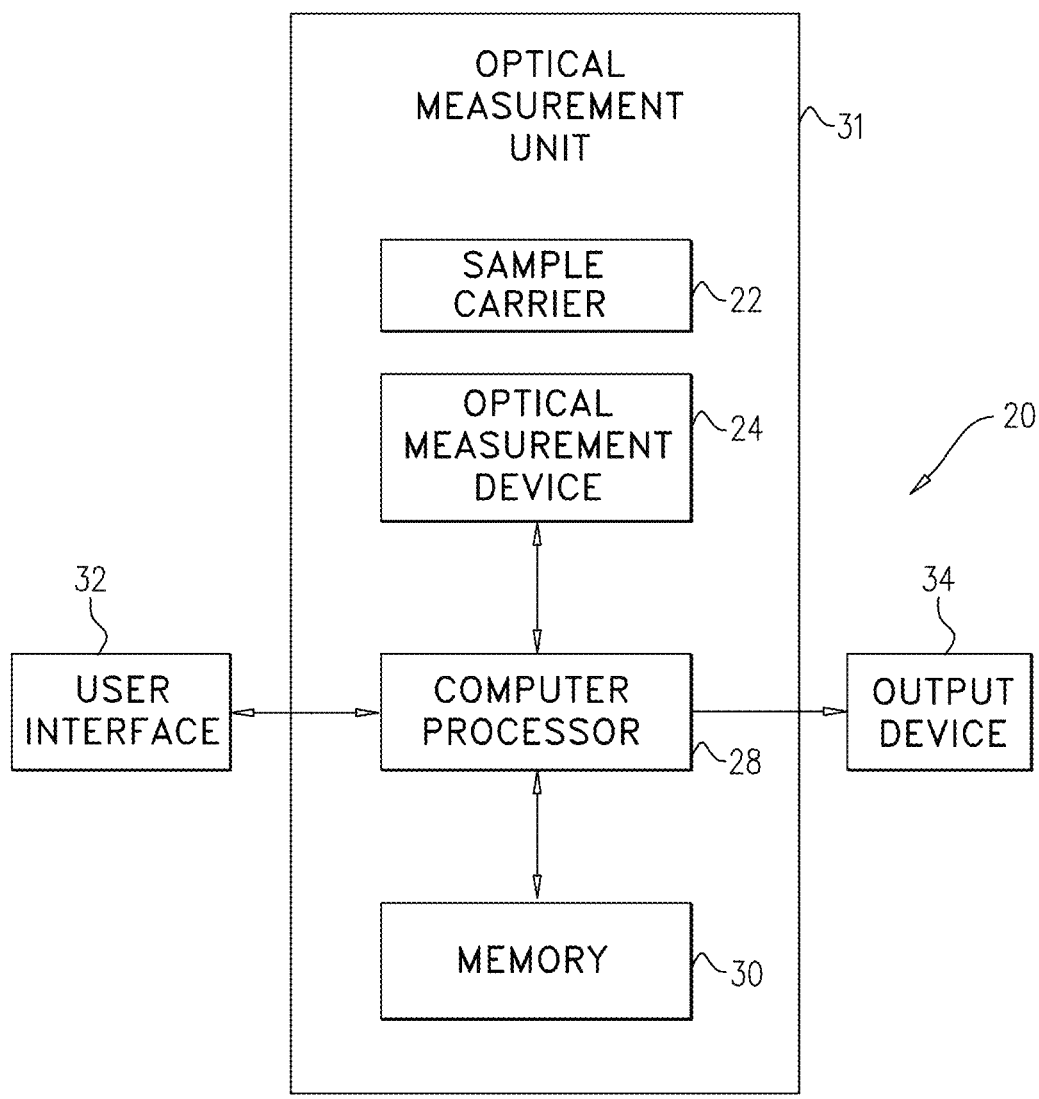
FIG. 1 is a block diagram showing components of a biological sample analysis system, in accordance some applications of the present invention.

Reference is now made to FIG. 1, which is block diagram showing components of a biological sample analysis system 20, in accordance with some applications of the present invention. Typically, a biological sample (e.g., a blood sample) is placed into a sample carrier 22. While the sample is disposed in the sample carrier, optical measurements are performed upon the sample using one or more optical measurement devices 24. For example, the optical measurement devices may include a microscope (e.g., a digital microscope), a spectrophotometer, a photometer, a spectrometer, a camera, a spectral camera, a hyperspectral camera, a fluorometer, a spectrofluorometer, and/or a photodetector (such as a photodiode, a photoresistor, and/or a phototransistor). For some applications, the optical measurement devices include dedicated light sources (such as light emitting diodes, incandescent light sources, etc.) and/or optical elements for manipulating light collection and/or light emission (such as lenses, diffusers, filters, etc.). For some applications, a microscope system is used that is generally similar to the microscope system described in US 2014/0347459 to Greenfield, which is incorporated herein by reference.

A computer processor 28 typically receives and processes optical measurements that are performed by the optical measurement device. Further typically, the computer processor controls the acquisition of optical measurements that are performed by the one or more optical measurement devices. The computer processor communicates with a memory 30. A user (e.g., a laboratory technician) sends instructions to the computer processor via a user interface 32. For some applications, the user interface includes a keyboard, a mouse, a joystick, a touchscreen device (such as a smartphone or a tablet computer), a touchpad, a trackball, a voice-command interface, and/or other types of user interfaces that are known in the art. Typically, the computer processor generates an output via an output device 34. Further typically, the output device includes a display, such as a monitor, and the output includes an output that is displayed on the display. For some applications, the processor generates an output on a different type of visual, text, graphics, tactile, audio, and/or video output device, e.g., speakers, headphones, a smartphone, or a tablet computer. For some applications, user interface 32 acts as both an input interface and an output interface, i.e., it acts as an input/output interface. For some applications, the processor generates an output on a computer-readable medium (e.g., a non-transitory computer-readable medium), such as a disk, or a portable USB drive, and/or generates an output on a printer.

For some applications, optical measurement device 24 (and/or computer processor 28 and memory 30) is housed inside an optical measurement unit 31. In order to perform the optical measurements upon the sample, sample carrier 22 is placed inside the optical measurement unit.

Figure 2A:
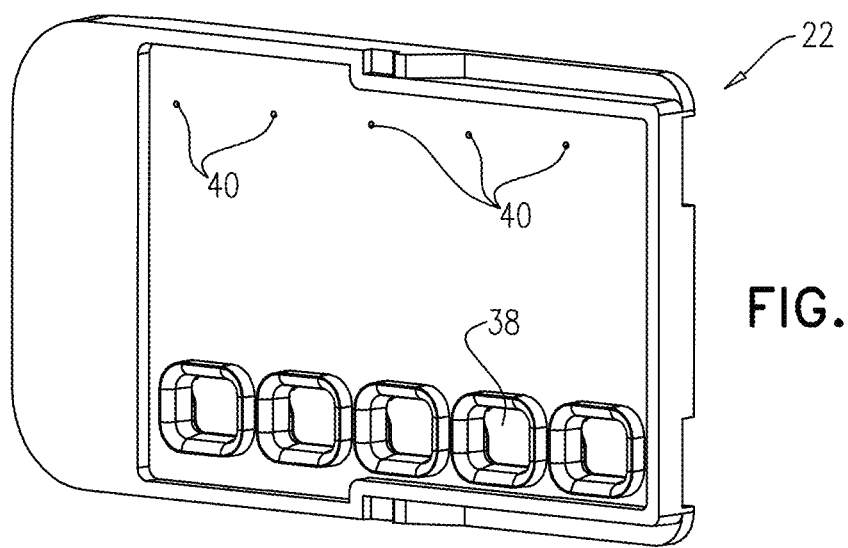
FIGS. 2A, 2B, 2C, and 2D are schematic illustrations of respective views of a sample carrier, in accordance with some applications of the present invention.
Figure 2B:
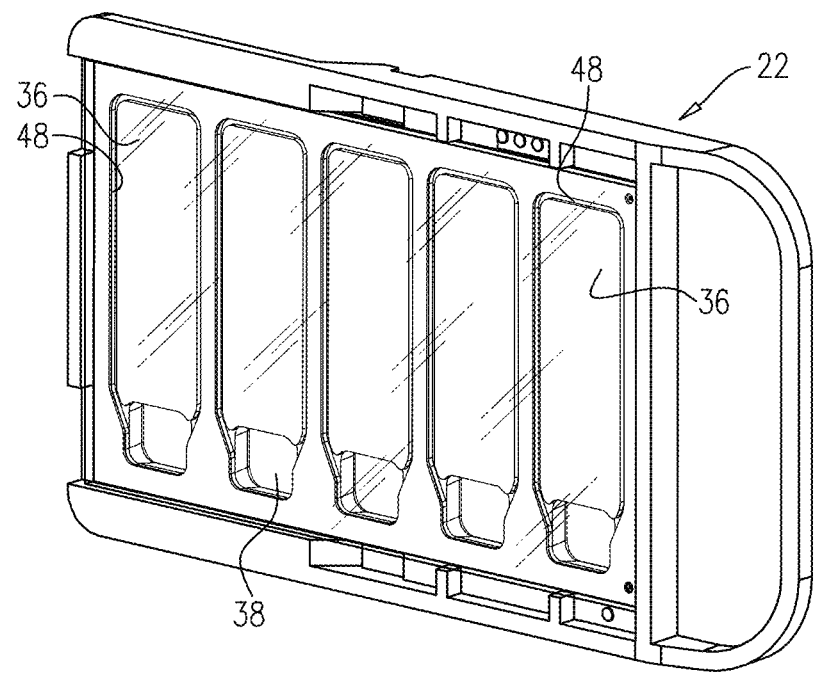

Reference is now made to FIGS. 2A and 2B, which are schematic illustrations of respective views of sample carrier 22, in accordance with some applications of the present invention. FIG. 2A shows a top view of the sample carrier (the top cover of the sample carrier being shown as being opaque in FIG. 2A, for illustrative purposes), and FIG. 2B shows a bottom view (in which the sample carrier has been rotated around its short edge with respect to the view shown in FIG. 2A). For some applications, sample carrier 22 includes a plurality of chambers 36, e.g., five chambers as shown in FIG. 2A. Typically, the chambers are filled with a bodily sample, such as blood via sample inlet holes 38. For some applications, the chambers define one or more outlet holes 40. The outlet holes are configured to facilitate filling of the chambers with the bodily sample, by allowing air that is present in the chambers to be released from the chambers. Typically, as shown, the outlet holes are located longitudinally opposite the inlet holes (with respect to a sample chamber of the sample carrier). For some applications, the outlet holes thus provide a more efficient mechanism of air escape than if the outlet holes were to be disposed closer to the inlet holes.

Figure 2C:
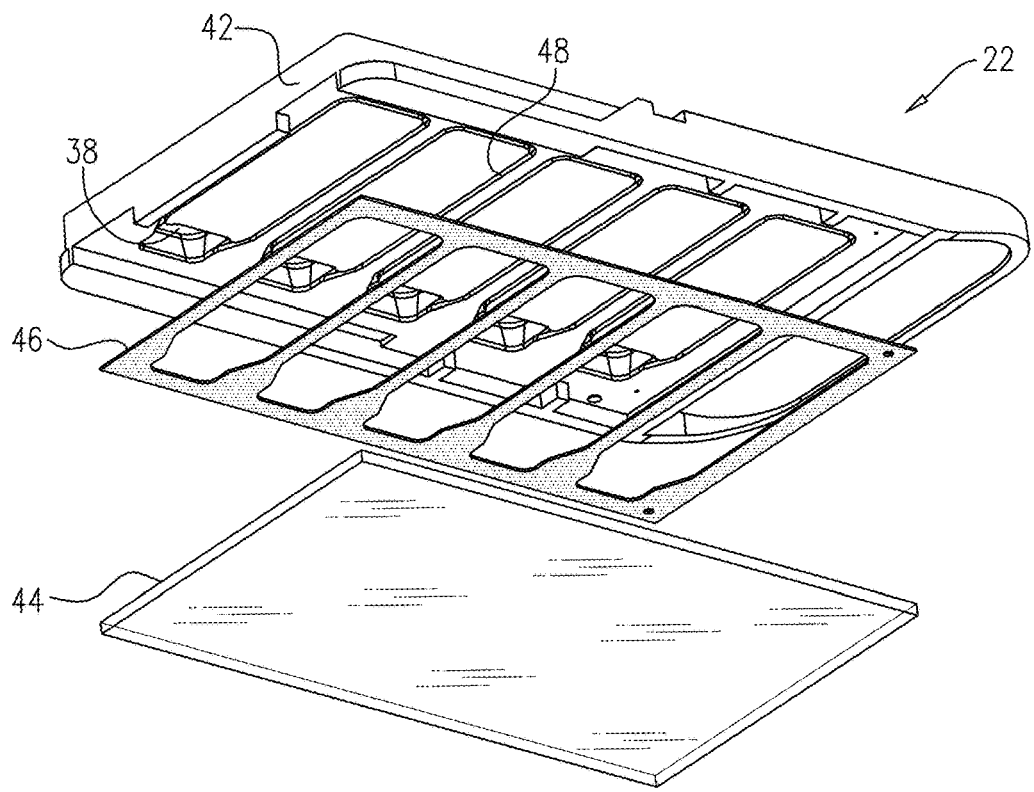
Figure 2D:
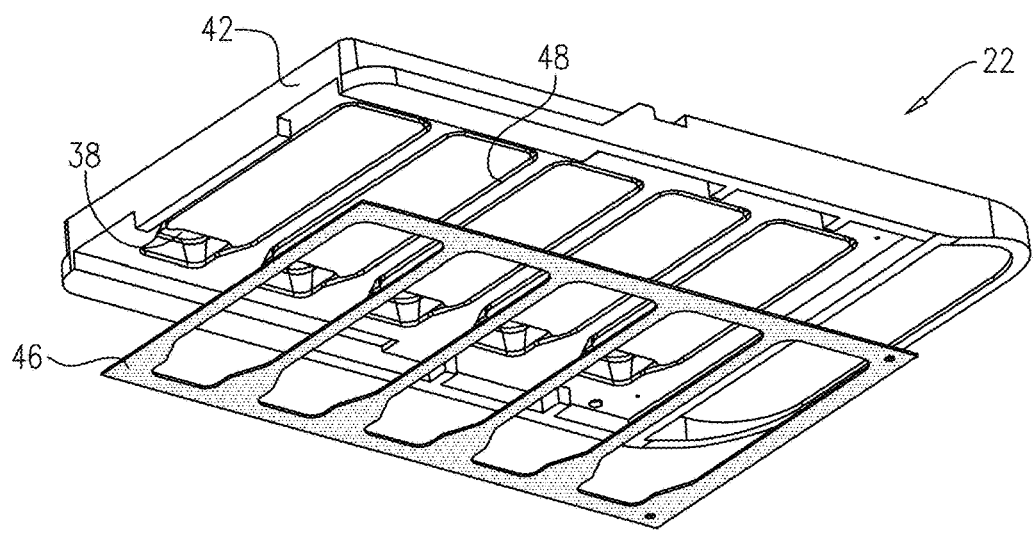

Reference is made to FIG. 2C, which shows an exploded view of sample carrier 22, in accordance with some applications of the present invention. For some applications, the sample carrier includes at least three components: a molded component 42, a glass sheet 44, and an adhesive layer 46 configured to adhere the glass sheet to an underside of the molded component. Reference is also made to FIG. 2D, which shows the molded component and the adhesive layer in the absence of the glass sheet, for illustrative purposes. The molded component is typically made of a polymer (e.g., a plastic) that is molded (e.g., via injection molding) to provide the chambers with a desired geometrical shape. For example, as shown, the molded component is typically molded to define inlet holes 38, outlet holes 40, and gutters 48 which surround the central portion of each of the chambers. The gutters typically facilitate filling of the chambers with the bodily sample, by allowing air to flow to the outlet holes, and/or by allowing the bodily sample to flow around the central portion of the chamber.

As described hereinabove, while the sample is disposed in the sample carrier, optical measurements are performed upon the sample using one or more optical measurement devices 24. Typically, the sample is viewed by the optical measurement device via the glass layer, glass being transparent at least to wavelengths that are typically used by the optical measurement device. Typically, the sample carrier is inserted into optical measurement unit 31, which houses the optical measurement device while the optical measurements are performed. Typically, the optical measurement unit houses the sample carrier such that the molded layer is disposed above the glass layer, and such that the optical measurement unit is disposed below the glass layer of the sample carrier and is able to perform optical measurements upon the sample via the glass layer. The sample carrier is formed by adhering the glass sheet to the molded component. For example, the glass sheet and the molded component may be bonded to each other during manufacture or assembly (e.g. using thermal bonding, solvent-assisted bonding, ultrasonic welding, laser welding, heat staking, adhesive, mechanical clamping and/or additional substrates). For some applications, the glass layer and the molded component are bonded to each other during manufacture or assembly using adhesive layer 46.

For some applications, diagnostic tests are performed on a sample carrier that is filled with a bodily sample that is taken from a subject. In such cases, there is a risk that a user will try to reuse the cartridge (e.g. after washing it). This could lead to the risk of erroneous results in diagnosing a subsequent sample that is placed in the sample carrier after is has already been used, e.g. due to cross-contamination, and/or debris being left in the sample carrier from its previous use. For some applications, as shown in FIGS. 2A-D, a sample carrier defines a plurality of chambers, which facilitates multiple samples being placed within respective chambers of a single cartridge, and/or multiple types of diagnostic tests being performed on respective portions of a single sample that is placed in respective chambers. In such cases, it may be desirable to enable the user to perform the various tests at respective different times. However, it is further desirable that the user does not reuse the same chamber, whether deliberately or accidentally. In some cases, a sample carrier may be configured to be reused, but for a limited number of times. For some applications, in order to prevent reuse of a sample carrier, reuse of a chamber of a sample carrier, and/or reuse of a sample carrier more than a given number of times, photobleaching apparatus and techniques are used, as described in further detail hereinbelow with reference to FIGS. 3A, 3B, and 3C.

For some applications, a portion of sample carrier 22 is configured to fluoresce, at least under certain conditions. For example, the portion of the sample carrier may be configured to fluoresce when exposed to light emitted by optical measurement device 24 (e.g., brightfield light or fluorescent light that is emitted by a microscope system). Or the portion of the sample carrier may be configured to fluoresce when placed within optical measurement unit 31 in which optical measurement device 24 is housed. As described hereinabove, for some applications, sample carrier 22 includes adhesive layer 46. For some applications, the adhesive layer, or a portion thereof, is configured to fluoresce in the above-described manner (e.g., by an adhesive material within the adhesive layer being configured to fluoresce, by the adhesive layer containing an additional material that is configured to fluoresce, and/or by the adhesive layer being coated with such a material). For some applications, the adhesive layer is a pressure-sensitive adhesive, at least a portion of which is configured to fluoresce. For example, the pressure-sensitive adhesive may be an acrylic-based pressure-sensitive adhesive, at least a portion of which is configured to fluoresce. For some applications, the portion of the sample carrier that is configured to fluoresce is further configured to undergo photobleaching in areas that are exposed to fluorescent excitation (e.g. in the UV part of the electromagnetic spectrum). For example, such areas may be configured to undergo photobleaching when exposed to fluorescent excitation for less than one minute, less than 10 seconds, or less than 1 second. Typically, the area that is photobleached can be viewed using the optical measurement device 24 (e.g., the microscope system), and further typically, the photobleaching remains visible for at least one week, e.g., at least one month, or one year.

Figure 3A:
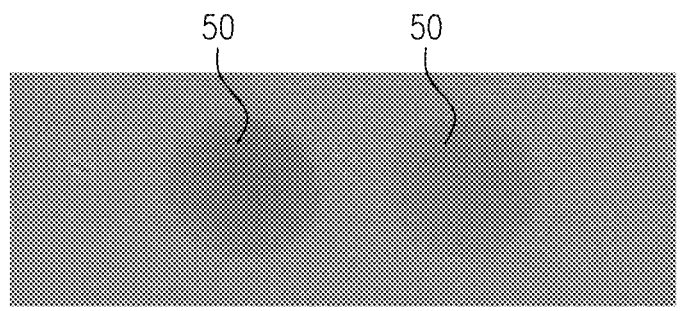
FIGS. 3A and 3B show photobleaching patterns that were detected upon a sample carrier immediately after being exposed to short-term fluorescent excitation (FIG. 3A), and one week after the exposure (FIG. 3B), in accordance with some applications of the present invention.
Figure 3B:
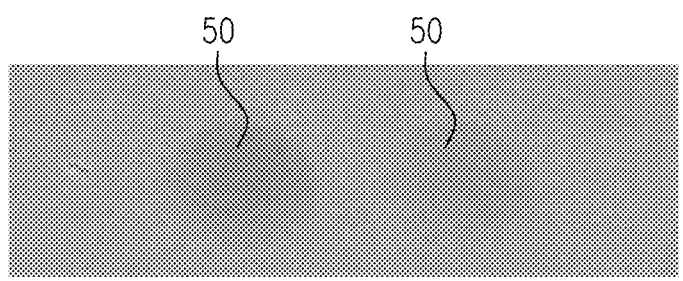

Reference is now made to FIGS. 3A and 3B, which show photobleached spots 50 on microscope images of a sample carrier immediately after being exposed to short-term fluorescent excitation (FIG. 3A), and one week after the exposure (FIG. 3B), in accordance with some applications of the present invention. The diameter of the spot shown in FIGS. 3A and 3B is approximately 2 mm, and as shown, it is visible in the microscope images.

Figure 3C:
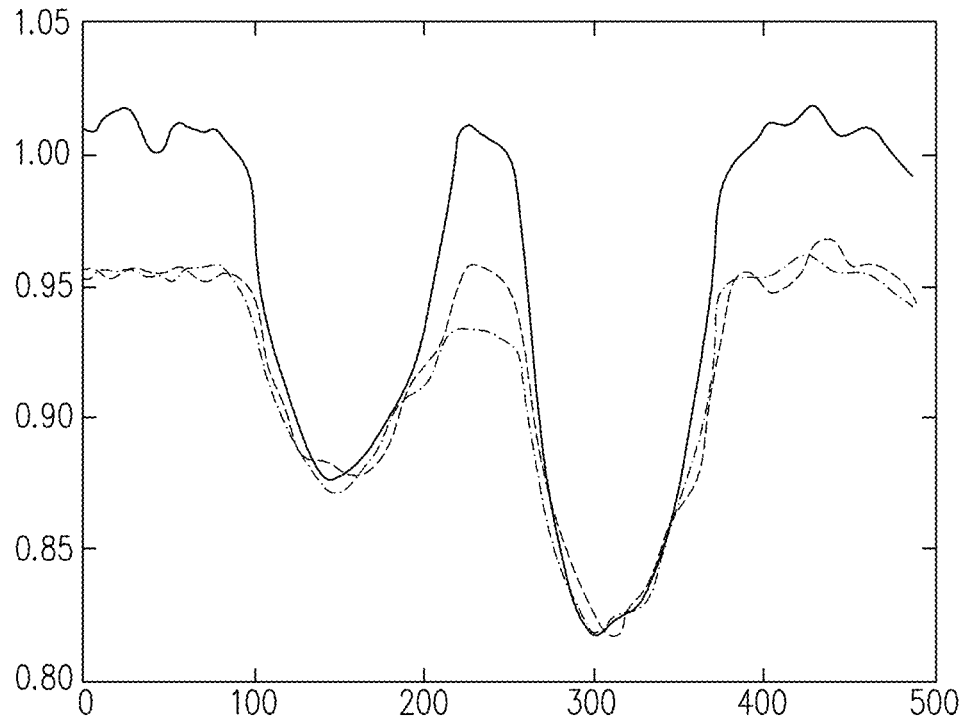
FIG. 3C is a plot of the fluorescent emission from the sample carrier measured along the length of the sample carrier, immediately after the sample carrier was exposed to the short-term fluorescent excitation, one week after the sample carrier was exposed to the short-term fluorescent excitation, and three weeks after the sample carrier was exposed to the short-term fluorescent excitation, in accordance with some applications of the present invention.

Reference is also made to FIG. 3C, which is a plot of the fluorescent emission from the sample carrier (y-axis) measured along the length of the sample carrier (x-axis), immediately after the sample carrier was exposed to the short-term fluorescent excitation (the curve with the uppermost peak between 200 and 300 along the x-axis), one week after the sample carrier was exposed to the short-term fluorescent excitation (the curve with the middle peak between 200 and 300 along the x-axis), and three weeks after the sample carrier was exposed to the short-term fluorescent excitation (the curve with the lowest peak between 200 and 300 along the x-axis), in accordance with some applications of the present invention. The plots were normalized to have equal intensities at the darkest spot.

In accordance with the effect that is demonstrated in FIGS. 3A-C, for some applications of the present invention, a portion of a sample carrier is analyzed, in order to determine whether the portion or an area thereof has undergone photobleaching. In response to detecting that the portion has undergone photobleaching, it is determined that the sample carrier, or a portion thereof (e.g., a chamber thereof) has already been used, and/or the number of times the sample carrier or the portion thereof (e.g., a chamber thereof) has been used. For some applications, the above steps are performed by computer processor 28. For some applications, in response to detecting that the sample carrier, or a portion thereof (e.g., a chamber thereof) has already been used, or that the usage of the sample carrier, or a portion thereof (e.g., a chamber thereof) has exceeded a given threshold, the computer processor generates an output indicating that the sample carrier, or the portion thereof (e.g., the chamber thereof), should not be used, generates an output indicating that the sample carrier, or the portion thereof (e.g., the chamber thereof) is contaminated, and/or prevents the optical measurement device from performing optical measurements upon the sample carrier, or the portion thereof (e.g., the chamber thereof).

For some applications, a given area of the sample carrier is marked by photobleaching the area when the sample carrier is used. For example, optical measurement device 24 may be configured to photobleach a given area of the sample carrier when the sample carrier is placed inside optical measurement unit 31 that houses the sample carrier while optical measurements are performed upon the portion of the sample. Alternatively or additionally, optical measurement device 24 may be configured to photobleach a given area of the sample carrier when the optical measurement device performs an optical measurement on the sample carrier. For some applications, the optical measurement device is configured to photobleach a given area of the sample carrier automatically, by virtue of performing optical measurements upon the sample carrier (i.e., without having to perform any activity specifically for the purpose of causing the photobleaching, which the optical measurement device would not have been performing in any event, in order to perform the optical measurements). For example, the optical measurement device may be a microscope system that performs fluorescent imaging upon the sample by exciting the sample and/or a stained portion of the sample with light that corresponds to an excitation wavelength of the sample and/or the stained portion of the sample, such that the light causes the sample and/or the stained portion of the sample to fluoresce. The light that is emitted by the microscope system, in order to cause the sample and/or the stained portion of the sample to fluoresce, may also photobleach the given area of the sample carrier. For some applications, prior to photobleaching the given area, the computer processor verifies that the sample carrier has not already been used, using the techniques described hereinabove.

As described hereinabove, for some applications, the sample carrier is configured to be reused, but only a limited number of times. For some such applications, each time the sample carrier is used, a respective different area of the sample carrier is photobleached, such that the computer processor may then determine how many times the sample carrier has been used by detecting the number and/or locations of photobleached areas upon the sample carrier.

For some applications, the above-described photobleaching effect is used by a manufacturer of sample carriers to encode manufacturing information regarding the sample carrier, in a manner which is not visible to the naked eye. For example, such information may include an authenticity mark (to reduce the likelihood of counterfeit sample carriers being utilized), sample carrier type, manufacturing date, expiry date, manufacturing location, date required for accurate performance of the test (e.g. calibration date pertaining to the sample carrier, or batch of sample carriers). For some such applications, the marking is marked using a geometric pattern that includes lines, figures, barcodes, alphanumeric characters, etc.

For some applications, a sample carrier that contains a given sample is analyzed more than once by the optical measurement devices. For example, the sample may be analyzed and then re-analyzed at certain time intervals. For some applications, respective portions of the same sample are placed in respective chambers of the sample carrier and are analyzed at respective time intervals. For some applications, in order to ensure that the same sample is being re-analyzed, the optical measurement device is configured to mark the sample carrier, via photobleaching, in a given manner. Subsequently, when the sample carrier is placed back inside the optical measurement unit, or a different optical measurement unit for the re-analysis, the computer processor verifies that it is the same sample carrier by identifying the marks on the sample carrier.

It is noted that the above-described apparatus and methods, which relate to photobleaching a portion of a sample carrier that is configured to fluoresce at least under certain conditions, is not limited to any particular design of the sample carrier. Rather, any design of sample carrier may be configured to incorporate such a portion. Similarly, the above-described apparatus and methods, which relate to photobleaching a portion of a sample carrier that is configured to fluoresce at least under certain conditions, is not limited to any particular portion of a sample carrier. Rather, any portion of a sample carrier may be configured to have such characteristics. For example, any portion of the molded component, the adhesive layer, or the glass sheet of a sample carrier as described herein may be configured in this manner.

Figure 4A:
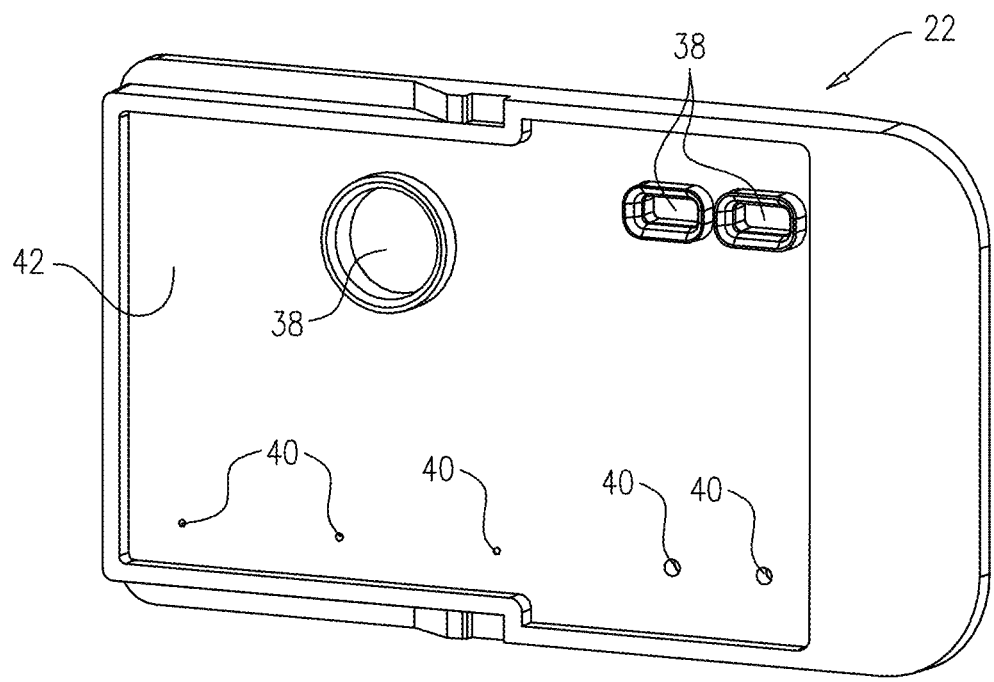
FIGS. 4A, 4B, and 4C are schematic illustrations of respective views of a sample carrier that is used for performing both microscopic measurements and optical density measurements, in accordance with some applications of the present invention.
Figure 4B:
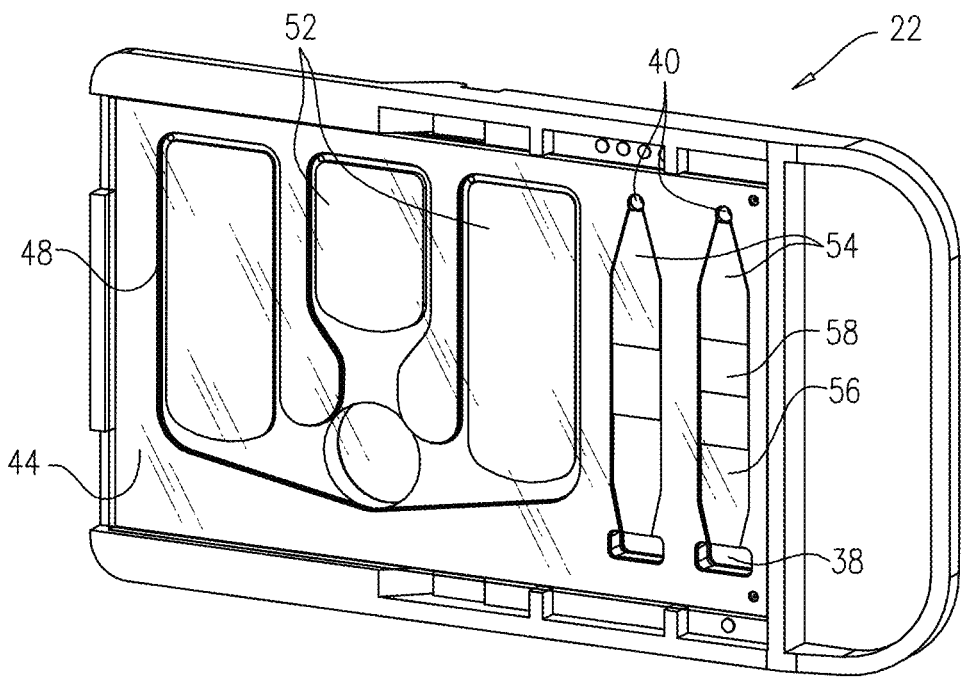
Figure 4C:
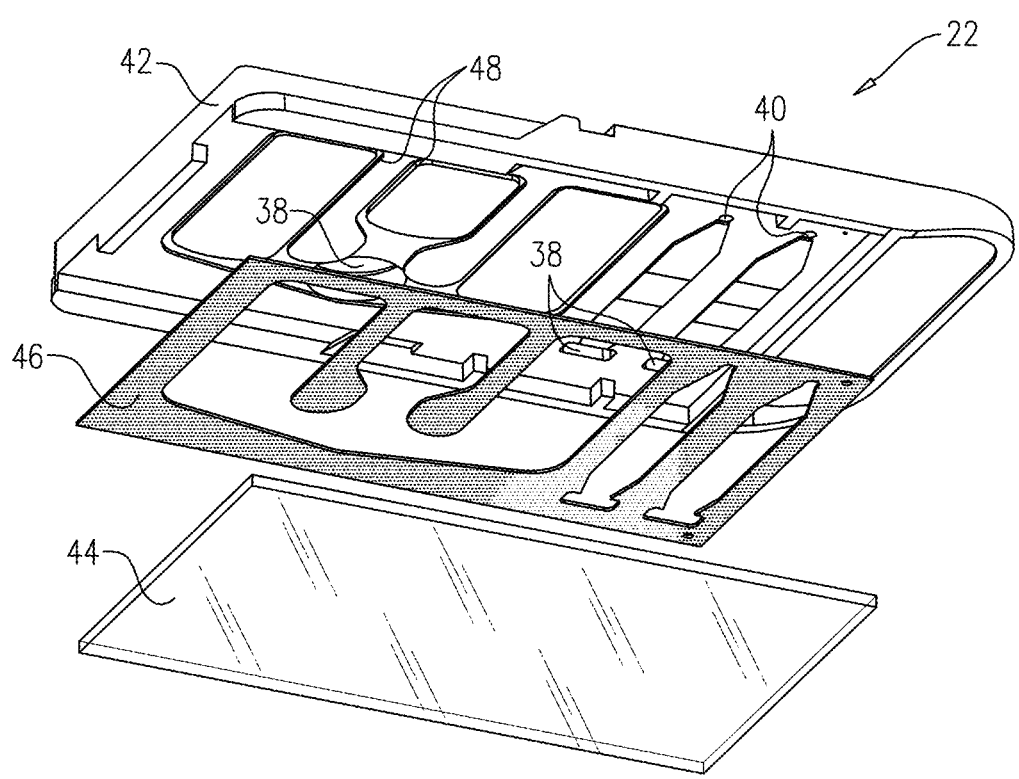

Reference is now made to FIGS. 4A, 4B, 4C, and 4D, which are schematic illustrations of respective views of sample carrier 22, the sample carrier being configured for facilitating both microscopic measurements, and optical density measurements with respect to the sample, in accordance with some applications of the present invention. FIG. 4A shows a top view of the sample carrier (the top cover of the sample carrier being shown as being opaque in FIG. 4A, for illustrative purposes), FIG. 4B shows a bottom view (in which the sample carrier has been rotated around its long edge with respect to the view shown in FIG. 4A), and FIG. 4C shows an exploded side view.

For some applications, a sample carrier as shown in FIGS. 4A-C is used when performing a complete blood count on a blood sample. For some applications, the sample carrier includes a first set 52 of chambers, which are used for performing microscopic analysis upon the sample, and a second set 54 of chambers, which are used for performing optical density measurements upon the sample. As described hereinabove with reference to FIGS. 2A-D, for some applications, the sample carrier is made of a molded component 42, a glass sheet 44 and an adhesive layer 46, as shown in FIG. 4C. For some applications, the adhesive layer is configured to fluoresce and/or to become photobleached, as described hereinabove. Typically, the molded component is configured to define inlet holes 38, outlet holes 40, and/or gutters 48, which are generally as described hereinabove.

As described in WO 17/195205 to Pollack, which is incorporated herein by reference, for some applications, chambers belonging to set 54 (which is used for optical density measurements), typically define at least a first region 56 (which is typically deeper) and a second region 58 (which is typically shallower), the height of the chambers varying between the first and second regions in a predefined manner.

Typically, in order to perform optical analysis upon the sample, it is desirable to know the optical path length, the volume, and/or the thickness of the portion of the sample upon which the optical measurements were performed, as precisely as possible. Further typically, the optical measurements are performed upon a portion of the sample disposed in a sample carrier that is defined by two or more opposing surfaces. In order to provide the desired level of precision, it is desirable for the two or more opposing surfaces to be separated by a distance that is correspondingly tightly set or tightly controlled. However, in some manufacture or assembly processes, the distance between the opposing surfaces may vary substantially. For example, the upper and lower surfaces of the chambers as shown in FIGS. 4A-C are defined respectively by the molded component, and the glass sheet, the molded component and glass sheet being coupled to one another via the adhesive layer. Although the adhesive layer has a nominal thickness, it is typically the case that, for example, due to variation in the manufactured thickness of the pressure-sensitive adhesive or in the pressure applied during its application, the actual thickness of the layer is different from the nominal thickness. For example, molded component and the glass sheet may be bonded using a pressure-sensitive adhesive layer with a nominal thickness that is configured to separate the opposing surfaces by a separation of 100 micrometers. In such a case, variation in the manufactured thickness of the pressure-sensitive adhesive layer or in the pressure applied during its application may result in a final thickness that may lie, for example, as far as 20 micrometers greater or less than the nominal thickness.

Typically, an optical measurement is performed on the sample. For example, the density of a component may be determined by performing a count of the component within a microscopic image. Similarly, the concentration and/or density of a component may be measured by performing optical absorption, transmittance, fluorescence, and/or luminescence measurements upon the sample. Without being bound by theory, an uncertainty of 20 percent in the distance separating the two opposing surfaces (as described in the above example), may, in turn, correspond to 20 percent uncertainty in parameters of the sample that are derived from the optical measurements that are performed upon the sample (such as, the derived concentration and/or density of a component within the sample), e.g., as described in WO 17/195205 to Pollack, which is incorporated herein by reference.

In accordance with some applications of the present invention, the above-described problems associated with uncertainty relating to the height of a sample chamber are at least partially overcome. Referring again to FIG. 4A, sample chambers belonging to set 54 define first region 56 and second region 58. The heights of first region 56 and second region 58 of the sample chamber are defined by a lower surface that is defined by the glass sheet and by an upper surface that is defined by the molded component. The upper surface at the second region is stepped with respect to the upper surface at the first region. The step between the upper surface at the first and second regions, provides a predefined height difference Δh between the regions, such that even if the absolute height of the regions is not known to a sufficient degree of accuracy, the height difference Δh is known to a sufficient degree of accuracy to determine a parameter of the sample, using the techniques described herein, and as described in WO 17/195205 to Pollack, which is incorporated herein by reference.

As described hereinabove, the molded component is shaped to define a stepped surface such as to define the manner in which the height of the chambers belonging to set 54 varies between the first and second regions. Typically, relative manufacturing tolerances within a single substrate, and especially between nearby surfaces, are tighter than manufacturing tolerances on positioning between different substrates or even between opposing surfaces lying within the same substrate. Therefore, it is typically the case that by having a single substrate define the manner in which the height of the one or more sample chambers varies between the first and second regions, the height difference between the first and second regions is relatively precise. For example, the molded component may be manufactured with relatively tight tolerances, for example, using injection molding, embossing or machining.

As described with reference to WO 17/195205 to Pollack, which is incorporated herein by reference, for some applications, chambers belonging to set 52 (which is used for microscopy measurements) have different heights from each other, in order to facilitate different measurands being measured using microscope images of respective chambers, and/or different chambers being used for microscopic analysis of respective sample types. For example, if a blood sample, and/or a monolayer formed by the sample, has a relatively low density of red blood cells, then measurements may be performed within a chamber of the sample carrier having a relatively great height, such that there is a sufficient density of cells, and/or such that there is a sufficient density of cells within the monolayer formed by the sample, to provide statistically reliable data. Such measurements may include, for example red blood cell density measurements, measurements of other cellular attributes, (such as counts of abnormal red blood cells, red blood cells that include intracellular bodies (e.g., pathogens, Howell-Jolly bodies), etc.), and/or hemoglobin concentration. Conversely, if a blood sample, and/or a monolayer formed by the sample, has a relatively high density of red blood cells, then such measurements may be performed upon a chamber of the sample carrier having a relatively low height, for example, such that there is a sufficient sparsity of cells, and/or such that there is a sufficient sparsity of cells within the monolayer of cells formed by the sample, that the cells can be identified within microscopic images. For some applications, such methods are performed even without the variation in height between the chambers belonging to set 52 being precisely known.

For some applications, based upon the measurand that is being measured, the chamber within the sample carrier upon which to perform optical measurements is selected. For example, a chamber of the sample carrier having a relatively great height may be used to perform a white blood cell count (e.g., to reduce statistical errors which may result from a low count in a shallower region), white blood cell differentiation, and/or to detect more rare forms of white blood cells. Conversely, in order to determine mean corpuscular hemoglobin (MCH), mean corpuscular volume (MCV), red blood cell distribution width (RDW), red blood cell morphologic features, and/or red blood cell abnormalities, microscopic images may be obtained from a chamber of the sample chamber having a relatively low height, since in such chambers the cells are relatively sparsely distributed across the area of the region, and/or form a monolayer in which the cells are relatively sparsely distributed. Similarly, in order to count platelets, classify platelets, and/or extract any other attributes (such as volume) of platelets, microscopic images may be obtained from a chamber of the sample chamber having a relatively low height, since within such chambers there are fewer red blood cells which overlap (fully or partially) with the platelets in microscopic images, and/or in a monolayer.

In accordance with the above-described examples, it is preferable to use a chamber of the sample carrier having a lower height for performing optical measurements for measuring some measurands within a sample (such as a blood sample), whereas it is preferable to use a chamber of the sample carrier having a greater height for performing optical measurements for measuring other measurands within such a sample. Therefore, for some applications, a first measurand within a sample is measured, by performing a first optical measurement upon (e.g., by acquiring microscopic images of) a portion of the sample that is disposed within a first chamber belonging to set 52 of the sample carrier, and a second measurand of the same sample is measured, by performing a second optical measurement upon (e.g., by acquiring microscopic images of) a portion of the sample that is disposed within a second chamber of set 52 of the sample carrier. For some applications, the first and second measurands are normalized with respect to each other, for example, using techniques as described in WO 17/195208 to Zait, which is incorporated herein by reference.

Figure 5A:
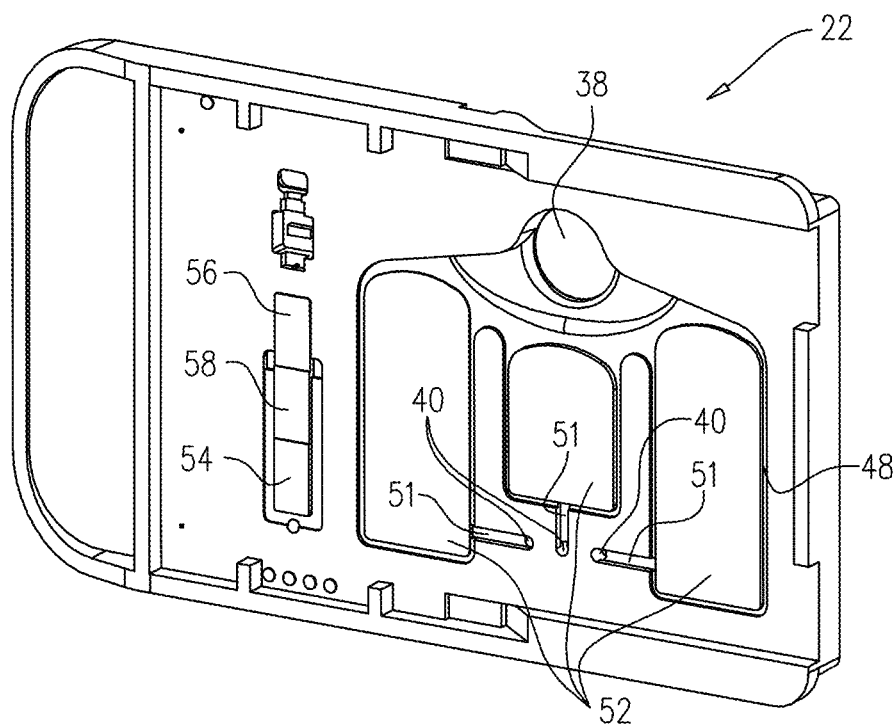
FIGS. 5A, 5B, and 5C are schematic illustrations of respective views of a sample carrier that is used for performing both microscopic measurements and optical density measurements, in accordance with some applications of the present invention.
Figure 5B:
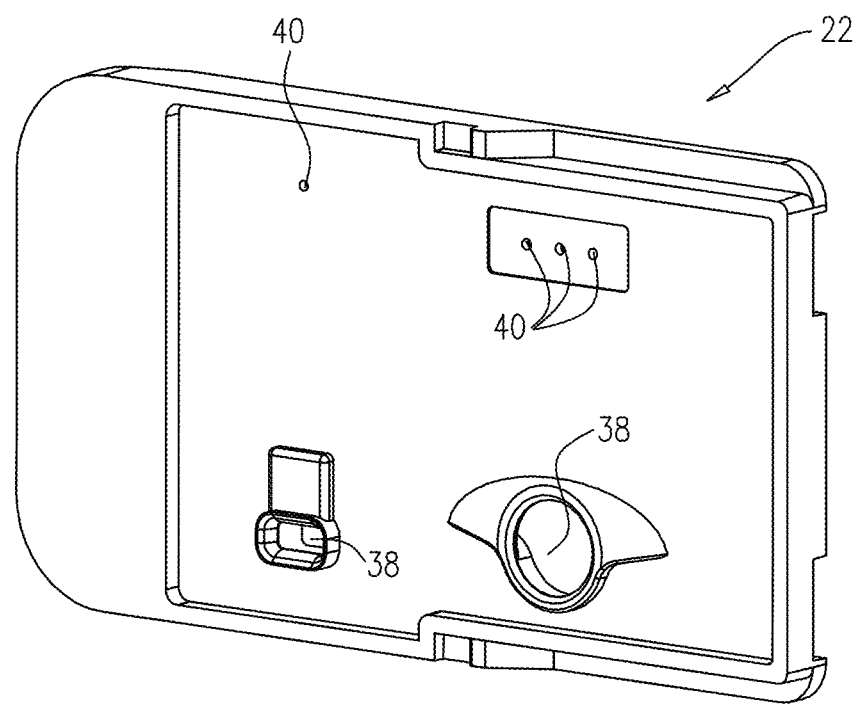
Figure 5C:
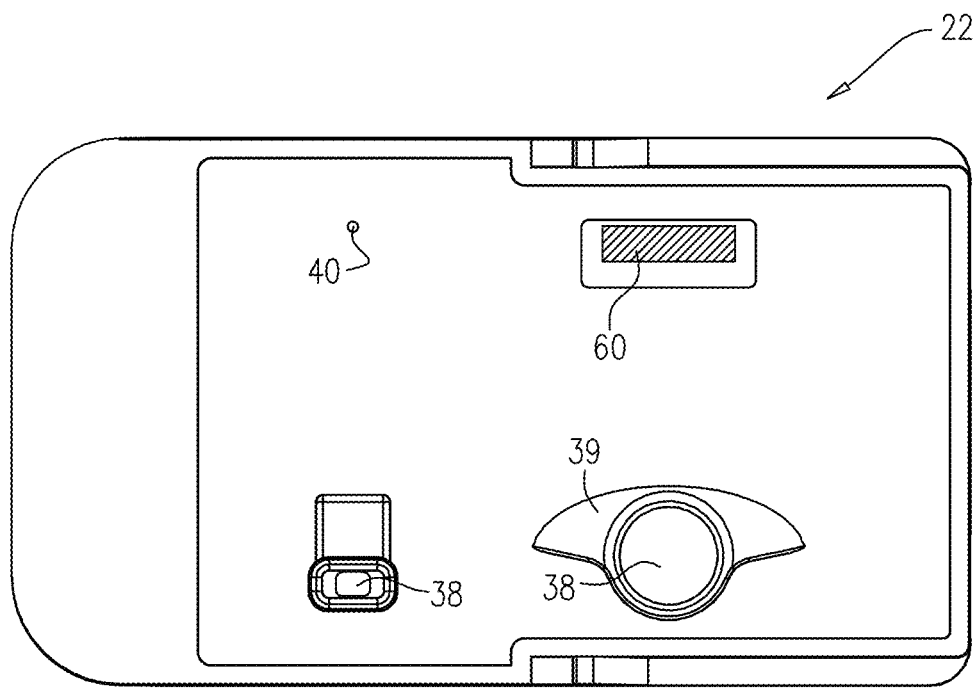

Reference is now made to FIGS. 5A, 5B, and 5C, which are schematic illustrations of respective views of sample carrier 22, the sample carrier being configured for use in performing both microscopic measurements, and optical density measurements, in accordance with some applications of the present invention. FIG. 5A shows a bottom view of the sample carrier, with the bottom surface being transparent, such that features of the chambers of the sample carrier may be observed. FIGS. 5B and 5C show top views of the sample carrier in which the top layer of the sample carrier is opaque (and in which the sample carrier has been rotated around its long edge with respect to the view shown in FIG. 5A).

Sample carrier as shown in FIGS. 5A, 5B, and 5C is generally similar to that shown in FIGS. 4A-C, and described with reference thereto, except for differences described hereinbelow. For some applications, the sample carrier includes first set 52 of chambers, which are used for performing microscopic analysis upon the sample, and second set 54 of chambers, which are used for performing optical density measurements upon the sample. For some applications, the second set of chambers, which are used for performing optical density measurements upon the sample includes only a single chamber, as shown. For some applications, there is a plurality of chambers within the first set 52 of chambers, which are used for performing microscopic analysis upon the sample, and each of the chambers defines an outlet hole 40 (which is generally as described hereinabove). For some such applications, the outlet holes of each of the chambers belonging to the first set of chambers are disposed in close proximity to each other (as shown in FIG.

5B), e.g., such that the holes are disposed along a line measuring less than 1 cm long. For example, there may be respective channels 51 leading from each of the chambers to its outlet hole, such that the outlet holes are disposed in close proximity to each other.

For some applications, a cover 60 (shown in FIG. 5C) is reversibly (or, optionally, irreversibly) coupled to the sample carrier, such as to cover the outlet holes. For example, the cover may include paper, sponge or filter material that has an adhesive backing. Typically, the cover is configured to prevent the sample from leaking out of the sample carrier, thereby reducing the likelihood of the optical measuring device becoming contaminated by leakage from the sample carrier. For some applications, the cover is configured to control the rate of filling of the first set 52 of chambers, by limiting the rate of air flow out of the chambers. For some applications (not shown), a cover that is generally similar to cover 60 is placed over outlet holes associated with second set 54 of chambers.

For some applications, sample carrier 22 is shaped to define a reservoir 39 that is adjacent to inlet hole 38. Typically, the reservoir is configured to allow the user to fill the chambers of the sample carrier with the bodily sample, such that, on the one hand, the user is not required to insert a precise volume of the bodily sample into the inlet hole, and yet, on the other hand, the inlet hole is left substantially free of liquids.

Figure 6:
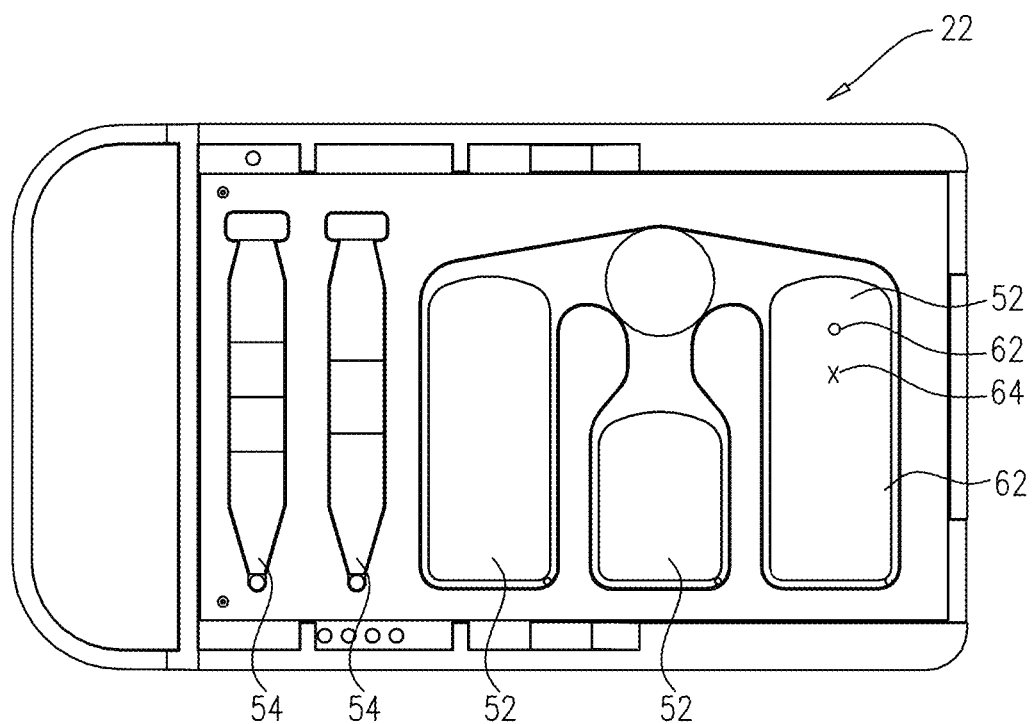
FIG. 6 is a schematic illustration of a sample carrier that includes markings on its upper and lower surfaces, in accordance with some applications of the present invention.

Reference is now made to FIG. 6 which is a schematic illustration showing a bottom view of sample carrier 22, a chamber of the sample carrier including a first marking 62 on its lower inner surface (i.e., the inner surface of the glass layer), and a second marking 64 on its upper inner surface (e.g., the inner surface of the substrate layer), in accordance with some applications of the present invention. In the view shown in FIG. 6, the inner surface of the substrate layer is visible through the transparent glass layer. In accordance with respective applications, the markings may constitute lines, or other shapes (e.g., alphanumeric characters). The markings may be imprinted on the sample carrier, drawn on the sample carrier, etched on the sample carrier, engraved on the sample carrier, glued on the sample carrier, embedded within the sample carrier, may constitute protrusions and/or indentations within the sample carrier and/or other visible features of the sample carrier, and/or may be attached to the sample carrier.

Typically, a sample fills a volume having a height that is defined by the upper and lower surfaces. For example, the volume of a portion of the sample in one of the chambers is defined by the area of the chamber multiplied by the height of the chamber. However, in some cases, the exact height of the chamber is not known, for example, for the reasons provided hereinabove. For some applications, the computer processor determines the height of the chamber by focusing an imaging module of the optical measurement device on first marking 62 and registering an indication of the focusing distance F1 associated with the first marking. The computer processor also focuses the imaging module of the optical measurement device on second marking 64 and registers an indication of the focusing distance F2 associated with the second marking. The computer processor then determines the height of the chamber, based upon the difference between F1 and F2. For some applications, the computer processor determines the volume of the chamber, or a portion thereof, based upon the determined height of the chamber. Typically, the computer processor determines a property of the sample at least partially based upon the determined height of the chamber, for example, using techniques as described hereinabove.

There is typically a degree of variation in the positioning of the sample carrier with respect to an imaging module of optical measurement device 24. For example, placement of the sample carrier on a microscope stage can vary significantly in view of the required imaging resolution (due for example to limitations of the microscope, variation in the sample carrier, variations in placement by an operator of the device, etc.). Therefore, in accordance with some applications, the positioning of the sample carrier with respect to an imaging module of optical measurement device 24 is determined, in accordance with the techniques described herein.

Figure 7A:
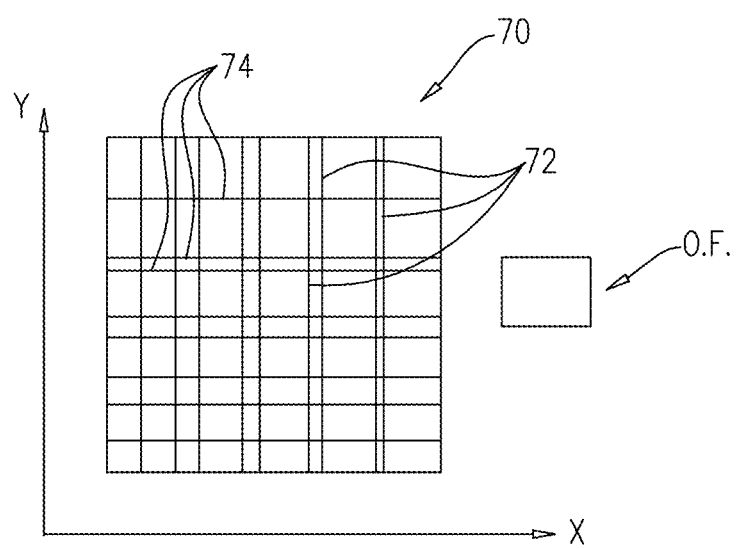
FIG. 7A is a schematic top view of an irregular pattern of a sample carrier, in accordance with some applications of the present invention.
Figure 7B:
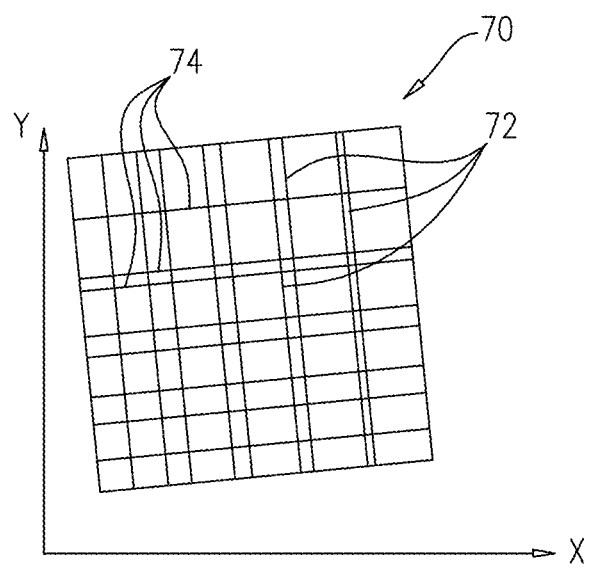
FIG. 7B is a schematic diagram illustrating the irregular pattern shown in FIG. 7A when tilted, in accordance with some applications of the present invention.
Figure 8A:
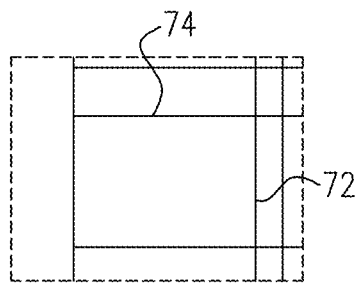
FIGS. 8A, 8B, 8C, and 8D are schematic top views of portions of the irregular pattern shown in FIG. 7A as viewed through an observation field of an imaging module of an optical measurement device, in accordance with some applications of the present invention.
Figure 8B:
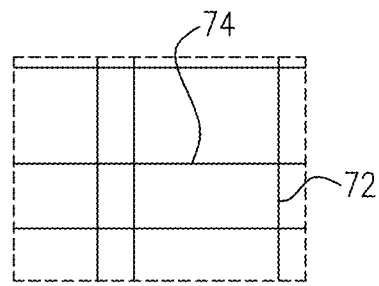
Figure 8C:
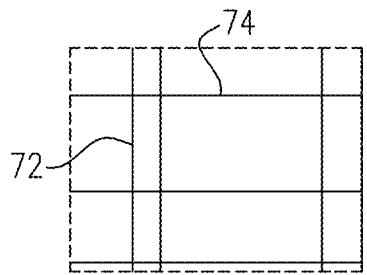
Figure 8D:
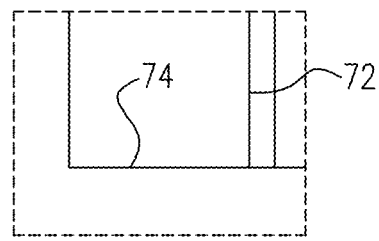
Figure 9A:
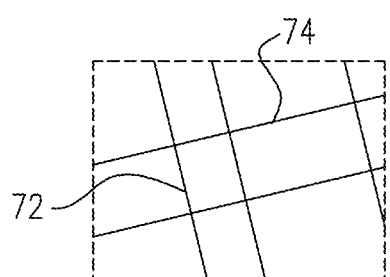
FIGS. 9A, 9B, 9C, and 9D are schematic top views of portions of the irregular pattern shown in FIG. 7B as viewed through an observation field of an imaging module of an optical measurement device, in accordance with some applications of the present invention.
Figure 9B:
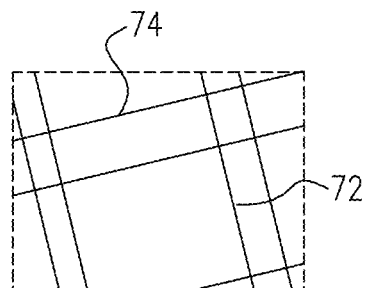
Figure 9C:
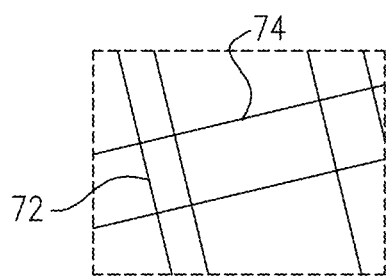
Figure 9D:
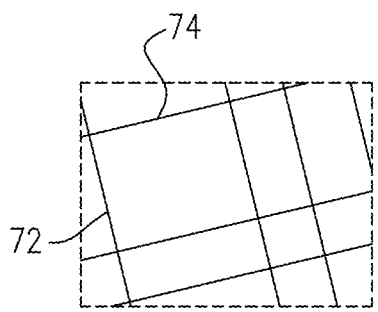

For some applications, the imaging module of the optical measurement device and a stage upon which the sample carrier is placed are initially positioned such that a visible mark on the sample carrier appears within the observation field of the imaging module. This is followed by scanning a portion of the sample carrier surface until sufficient information is available to define the sample carrier's position and/or orientation at least with respect to the X-Y plane. (In the present application, the term Z-axis is used to refer to the optical axis of the optical system, and the X-Y plane is used to denote the plane that is perpendicular to the optical axis, as is common in the art.) Reference is now made to FIGS. 7A and 7B, in which an example of an irregular pattern 70 is shown, the pattern including a set of vertical lines 72 and horizontal lines 74 confined within a square boundary 76, in accordance with some applications of the present invention. FIG. 7B shows the irregular pattern shown in FIG. 7A in an orientation that is tilted with respect to that shown in FIG. 7A. For some applications, an irregular pattern, such as that shown in FIGS. 7A-B, is marked upon sample carrier 22. Optical measurement device, which typically includes a microscope system, images the sample carrier via an observation field. Typically, such observation fields image sub-portions within chambers of the sample carrier.

It may be observed that the spacing between the vertical lines 72 is irregular, i.e. the distance between each two neighboring vertical lines 72 is different than any of two other neighboring vertical lines 72. The same design is applied to the horizontal lines. By way of example, the irregular pattern may measure about 2.7×2.7 mm$^2$, while the observation field may measure about 0.6×0.8 mm$^2$.

It is noted that while irregular pattern 70 and the observation field are shown as being essentially rectangular or square, any other shape may be used. For example, a round or other shape observation field may be selected, for example based on optical limitations which may provide a better image in a portion of a diagnostic field.

As described hereinabove, the optical measurement device is typically used to capture images of the sample using an observation field O.F. (also referred herein as an orientation field), which has a predetermined size and shape, and through which (when properly place above the sample carrier) a portion of the sample carrier can be viewed. The irregular pattern is designed with a resolution that is complementary to the observation field size so that in any lateral X-Y position of the observation field over the irregular pattern, the portion of the irregular pattern observed through the observation field is unique to that specific position and detectable at the set resolution of the device. Optionally, an observation field may be a diagnostic field or a portion thereof. In some embodiments, an observation field is assembled using a plurality of adjacent diagnostic fields, such that the combined information from two or more diagnostic fields is used as an observation field.

Reference is now made to FIGS. 8A, 8B, 8C, and 8D, in which examples of the pattern corresponding to respective observation fields are shown, in accordance with some applications of the present invention. It may be observed that the image of the portion of the irregular pattern captured at different positions of the observation field is different for each such position. The irregular pattern is designed so that the images captured at any two different X-Y positions will yield different visible portions of the irregular pattern.

It is also noted that, typically, the resolution of the irregular pattern is designed to be complementary to the size and shape of the observation field, such that it is typically not the case that the observation field is smaller than the distance between two neighboring lines of the pattern (either horizontal or vertical), so that an observation field never includes a single line, an empty space or the sole thickness of a single line. Typically, the only exception to this configuration is an irregular pattern designed specifically so that such a single line, empty space and/or sole thickness can occur in a single position of the observation field across the entire irregular pattern.

Since each position of the observation field corresponds to its own unique pattern, the computer processor typically determines the position of the irregular pattern with respect to the observation field. Since the irregular pattern is fixedly associated with the sample carrier, the computer processor thereby determines the location, and optionally orientation, of the sample carrier that is imaged within the observation field.

Reference is now made to FIGS. 9A, 9B, 9C, and 9D, in which some additional examples of the pattern corresponding to respective observation fields are shown, in accordance with some applications of the present invention. It is noted, with reference to the examples shown in FIGS. 9A-D, that not only the X-Y position of the irregular pattern be determined via the observation field, but also the orientation thereof. Thus, for some applications, the computer processor determines which portion of the sample carrier is being imaged in a given observation field, as well as the orientation of the sample carrier within the observation field, based upon the irregular pattern that is identified within the observation field.

In accordance with some applications, the irregular pattern is imprinted on the sample carrier, drawn on the sample carrier, etched on the sample carrier, engraved on the sample carrier, glued on the sample carrier, embedded within the sample carrier, constitutes protrusions and/or indentations within the sample carrier, and/or other visible features of the sample carrier, and/or is attached to the sample carrier. Typically, the irregular pattern (e.g., a 2D pattern as described with reference to FIGS. 7A-10C, and/or a 3D pattern as described with reference to FIG. 11A-11F) is formed upon the inner surface of the molded layer of the sample carrier. Alternatively or additionally, the irregular pattern is formed on a surface of the glass layer of the sample carrier. For some applications, an irregular pattern as described with reference to any one of FIG. 7A-12 is used on a sample carrier having different characteristics to the sample carriers described with reference to FIGS. 2A-6.

Figure 10A:
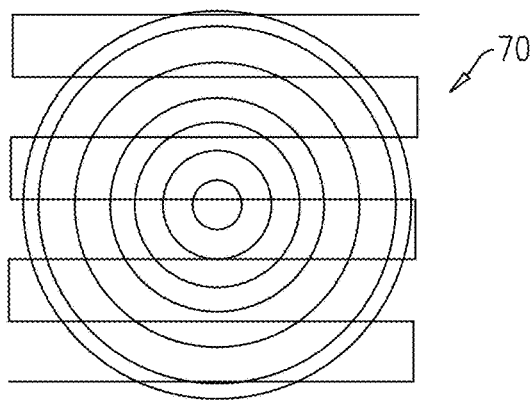
FIGS. 10A, 10B, and 10C are schematic top views of some examples of irregular patterns, in accordance with some applications of the present invention.
Figure 10B:
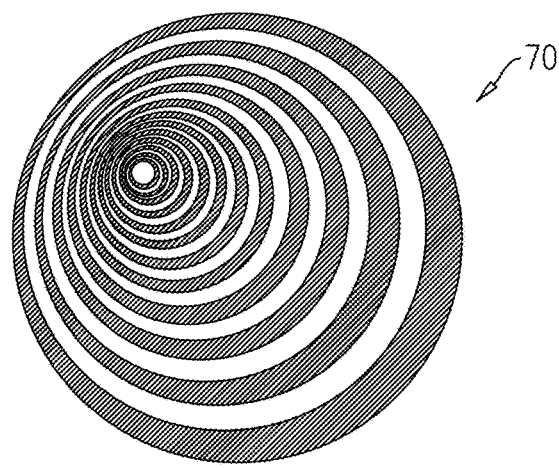
Figure 10C:
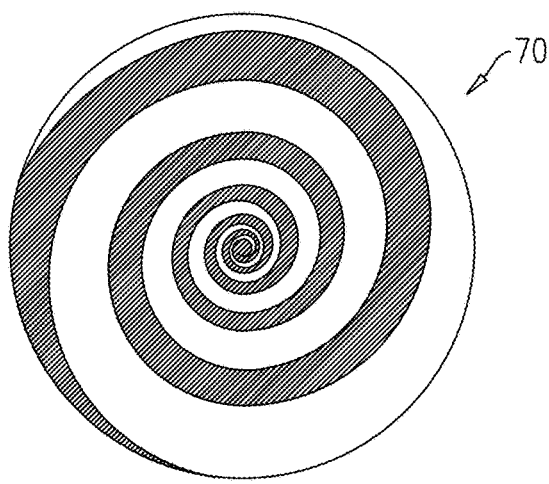

Reference is now made to FIGS. 10A, 10B and 10C, in which three additional examples of irregular patterns are shown, in accordance with some applications of the present invention.

The examples that are shown are as follows:

FIG. 10A—a set of concentric circles of uniquely different diameters, and being overlapped by a rectangular wave pattern;

FIG. 10B—a set of circles of uniquely different diameters and varying line thicknesses, and which are not concentric; and FIG. 10C—a spiral configuration of varying line thickness.

Each of the patterns shown in FIGS. 10A to 10C provides a unique image to respective observation fields that are disposed at different X-Y positions above the irregular pattern. In addition, each of the patterns shown in FIGS. 10A to 10C provides a unique image to respective observation fields that are disposed at different angular orientations above the irregular pattern, such that it is possible to distinguish between angular positions that are separated by less than 5 degrees.

In principle, it should be appreciated that while a single irregular pattern may be sufficient for determining both location and orientation of the sample carrier, the subject matter of the present disclosure does not exclude the use of two or more such patterns in a single carrier/chamber, potentially allowing for more accurate results.

For some applications, the irregular pattern is a 3D pattern having elements thereof located at different heights along the Z-axis. Optionally, the maximum height of the 3D pattern relative to the minimum height measures about 10 µm. For some applications, the 3D pattern is marked on a surface having the same position along the optical axis of the imaging module of the optical measurement device as the surface upon which the sample is to be imaged. For example, the 3D pattern may be located on the surface and/or be embedded within the material.

It should be noted that according to some applications, a 3D pattern is used such that even a single image, or no more than 10 images, are needed to provide sufficient information to determine the position, and optionally also orientation of the sample carrier, with respect to an imaging module of an optical measurement device, both with respect to an XY plane of the observation field and along the optical axis of the imaging module.

For some applications, the 3D pattern is associated with a 2D pattern or mark as described above (either juxtaposed therewith or being a part thereof), so that once information is gathered from the 2D mark or pattern (regarding the position, and optionally orientation, of the sample carrier with respect to an X-Y plane of the visual examination zone), a single image of the 3D pattern is enough to determine the location of the sample carrier along the optical axis of an imaging module.

Figure 11A:
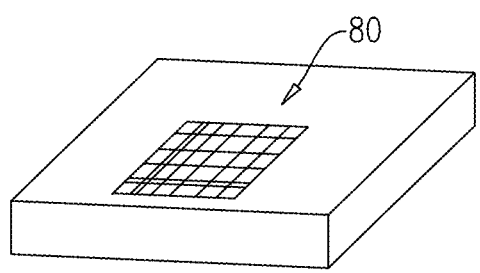
FIG. 11A is a schematic illustration of a 3D irregular pattern on a sample carrier, in accordance with some applications of the present invention.

Reference is now made to FIG. 11A in which a 3D pattern 80 is shown, in which the irregular pattern is reflected not only in the 2D grid design, but also in varying depths of different areas of the pattern, in accordance with some applications of the present invention. In particular, the 3D pattern is in the form of an irregular grid of rectangular portions, each rectangle having a top at a certain depth from the surface, such that at least some different rectangles have different depths.

Figure 11B:
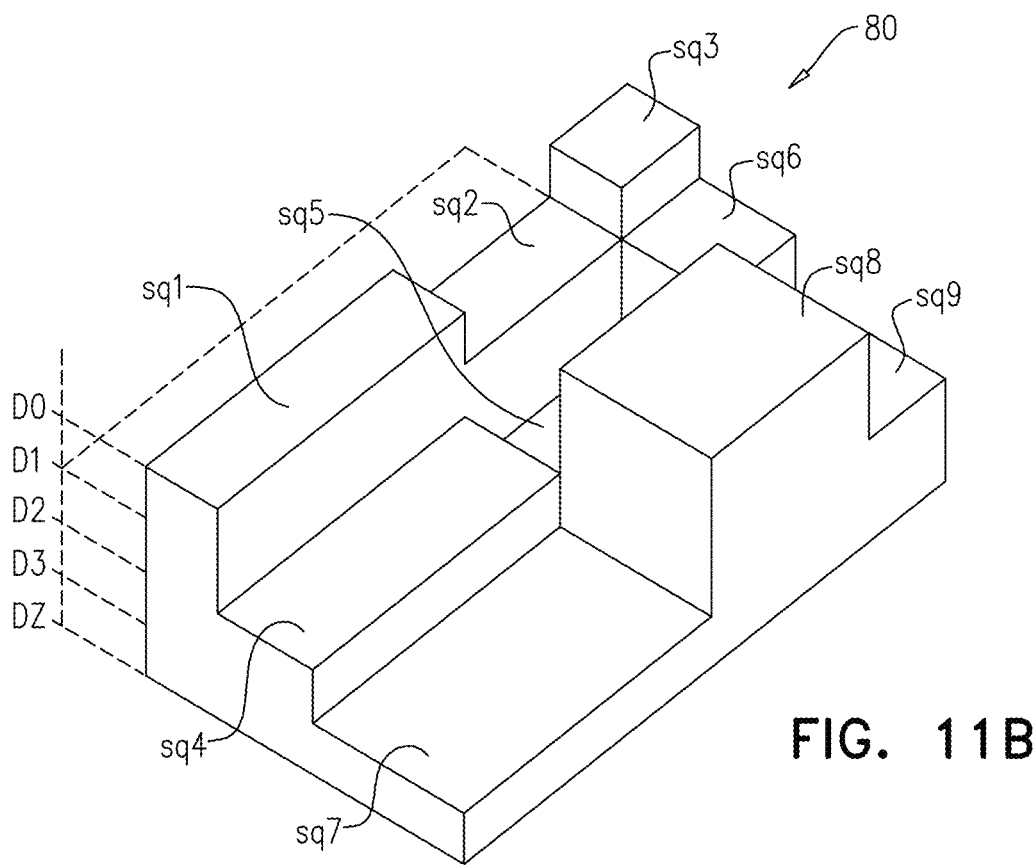
FIG. 11B is a schematic 3D illustration of a portion of the 3D irregular pattern shown in FIG. 11A, in accordance with some applications of the present invention.
Figure 11C:
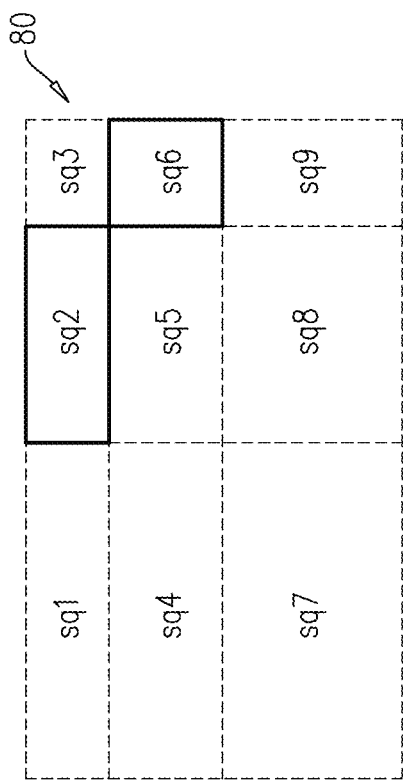
FIGS. 11C, 11D, 11E, and 11F are schematic 2D top views of the portion shown in FIG. 11B, taken at respective different focal lengths of an optical field of an imaging module of an optical measurement device, in accordance with some applications of the present invention.
Figure 11E:
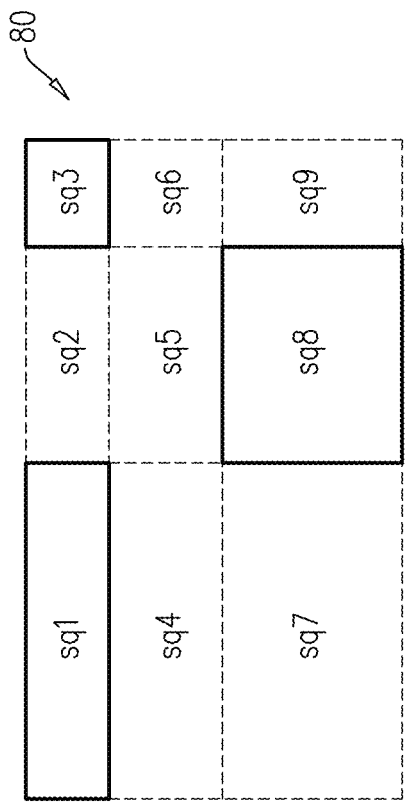
Figure 11D:
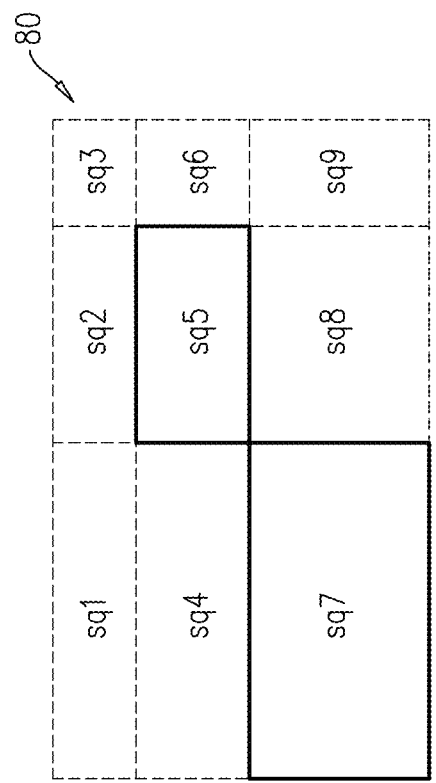
Figure 11F:
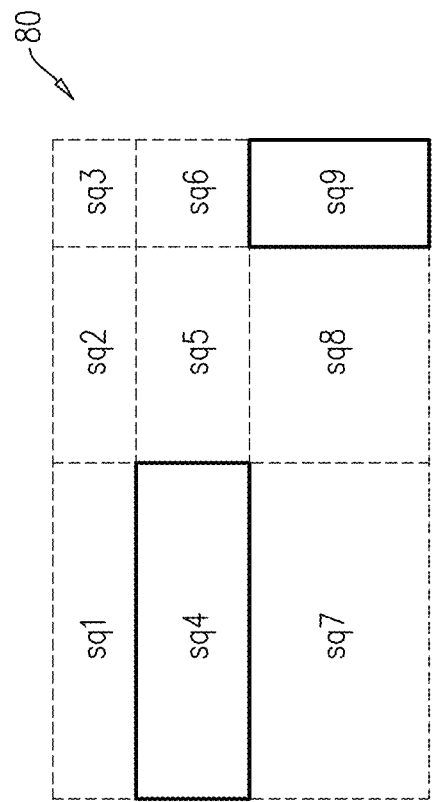

Reference is also made to FIG. 11B, in which a portion of the 3D pattern is shown (e.g. a portion of the pattern observed by the observation field O.F.), comprising nine rectangles sq1 to sq9, each rectangle being at one of four depths D0 to D3, in accordance with some applications of the present invention. Specifically, the arrangement shown in FIG. 11B is as follows:

| Rectangle No. | Depth |
|---|---|
| sq1, sq3, sq8 | D0 |
| sq2, sq6 | D1 |
| sq4, sq9 | D2 |
| sq5, sq7 | D3 |

Reference is also made to FIGS. 11C to 11F, each showing an example of an image of the 3D portion taken by the imaging module of the optical measurement device at depths D0 to D3 respectively, in accordance with some applications of the present invention. It may be observed that, at each focal length of the imaging module of the optical measurement device, corresponding to each of the depths D0 to D3, the image received is such that the boundaries of the rectangles at that depth/focal length are clearly visible (indicated by the solid lines), while the remainder of the rectangles (which are not located at that depth/focal length) are not in focus (indicated by the dashed lines).

Thus, for some applications, the 3D feature of the irregular pattern is used by computer processor 28 to provide an additional degree of accuracy for determining the position of the sample carrier with respect to the imaging module of the optical measurement device. Alternatively or additionally, the 3D feature of the irregular pattern is used by computer processor 28 to provide an indication as to the focal length of the imaging module of the optical measurement device. A single image taken of the 3D pattern may provide sufficient information regarding the position of the grid in the X-Y plane as well as along the optical axis of the imaging module of the optical measurement device. Optionally, once the X-Y position is known, an image (e.g., a single image) of the 3D pattern is taken at the known X-Y position, and the computer processor derives the location of the 3D pattern along the optical axis of the imaging module of the optical measurement device using the image.

It should be appreciated that the depths D0 to D3 are not necessarily equally spaced, and the height differences between respective pairs of consecutive height levels can be different from each other.

Figure 12:
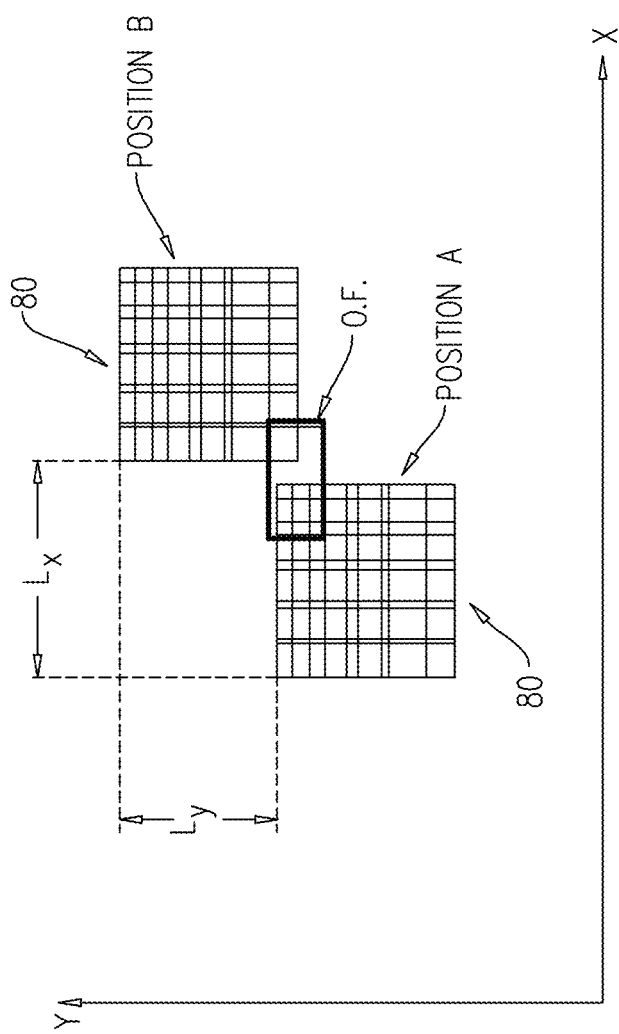
FIG. 12 is a schematic XY position chart demonstrating some possible planar positions of a sample carrier with respect to an imaging module of an optical measurement device, in accordance with some applications of the present invention.

Reference is now made to FIG. 12, which is a schematic illustration of the spatial arrangement of an irregular pattern of a sample carrier with respect to an observation field O.F. of the imaging module of optical measurement device 24, in accordance with some applications of the present invention. As shown, a sample carrier may be located in one of a plurality of X-Y positions with respect to the observation field. In this example, two extreme positions, Position A and Position B, of the sample carrier with respect to the observation field are depicted, the positions differing in location by a length Lx along the X-axis, and by a length Ly along the Y-axis. The spatial arrangement of the irregular pattern along the carrier is typically such that at least a portion of the irregular pattern falls within the observation field, regardless of the relative position of the carrier with respect to the optical device. Thus, the position of the sample carrier with respect to the imaging module of the optical measurement device does not affect the optical measurement device's ability to operate properly.

For some applications, the sample as described herein is a sample that includes blood or components thereof (e.g., a diluted or non-diluted whole blood sample, a sample including predominantly red blood cells, or a diluted sample including predominantly red blood cells), and parameters are determined relating to components in the blood such as platelets, white blood cells, anomalous white blood cells, circulating tumor cells, red blood cells, reticulocytes, Howell-Jolly bodies, etc.

In general, it is noted that although some applications of the present invention have been described with respect to a blood sample, the scope of the present invention includes applying the apparatus and methods described herein to a variety of samples. For some applications, the sample is a biological sample, such as, blood, saliva, semen, sweat, sputum, vaginal fluid, stool, breast milk, bronchoalveolar lavage, gastric lavage, tears and/or nasal discharge. The biological sample may be from any living creature, and is typically from warm blooded animals. For some applications, the biological sample is a sample from a mammal, e.g., from a human body. For some applications, the sample is taken from any domestic animal, zoo animals and farm animals, including but not limited to dogs, cats, horses, cows and sheep. Alternatively or additionally, the biological sample is taken from animals that act as disease vectors including deer or rats.

For some applications, similar techniques to those described hereinabove are applied to a non-bodily sample. For some applications, the sample is an environmental sample, such as, a water (e.g. groundwater) sample, surface swab, soil sample, air sample, or any combination thereof. In some embodiments, the sample is a food sample, such as, a meat sample, dairy sample, water sample, wash-liquid sample, beverage sample, and/or any combination thereof.

Applications of the invention described herein can take the form of a computer program product accessible from a computer-usable or computer-readable medium (e.g., a non-transitory computer-readable medium) providing program code for use by or in connection with a computer or any instruction execution system, such as computer processor 28. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Typically, the computer-usable or computer readable medium is a non-transitory computer-usable or computer readable medium.

Examples of a computer-readable medium include a semiconductor or solid state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor (e.g., computer processor 28) coupled directly or indirectly to memory elements (e.g., memory 30) through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present invention may be written in any combination of one or more programming languages, including an object-oriented programming language such as Java, Smalltalk, C++ or the like and conventional procedural programming languages, such as the C programming language or similar programming languages.

It will be understood that algorithms described herein, can be implemented by computer program instructions. These computer program instructions may be provided to a processor of a general-purpose computer, special purpose computer, or other programmable data processing apparatus to produce a machine, such that the instructions, which execute via the processor of the computer (e.g., computer processor 28) or other programmable data processing apparatus, create means for implementing the functions/acts specified in the algorithms described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the flowchart blocks and algorithms. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the algorithms described in the present application.

Computer processor 28 is typically a hardware device programmed with computer program instructions to produce a special purpose computer. For example, when programmed to perform the algorithms described herein, computer processor 28 typically acts as a special purpose sample-analysis computer processor. Typically, the operations described herein that are performed by computer processor 28 transform the physical state of memory 30, which is a real physical article, to have a different magnetic polarity, electrical charge, or the like depending on the technology of the memory that is used.

There is provided, in accordance with some applications of the present invention, the following inventive concepts:

Inventive concept 1. Apparatus comprising:
  a sample carrier configured to carry a sample; and
  an optical measurement device configured to perform optical measurements upon the sample, the optical measurement device defining an observation field,
  the sample carrier comprising a surface that comprises at least one irregular pattern, such that any portion of the surface of the sample carrier having a shape and area that corresponds to the observation field of the optical measurement device and that contains at least a portion of the pattern has a geometric pattern unique to that portion.

Inventive concept 2. The apparatus according to inventive concept 1, wherein the irregular pattern is configured to facilitate determining a position of the sample carrier with respect to a plane of the observation field, based on a single image of any portion of the surface of the sample carrier that contains a portion of the pattern having a geometric pattern unique to that portion.

Inventive concept 3. The apparatus according to inventive concept 1, wherein the irregular pattern has a given orientation with respect to the surface of the sample carrier, such that the sample carrier facilitates determining orientation of the sample carrier with respect to the observation field of the optical measurement device Inventive concept 4. The apparatus according to inventive concept 1, wherein the irregular pattern is present on the surface of the carrier using one or more techniques selected from the group consisting of: drawing, embossing, etching, carving, and adhering.

Inventive concept 5. The apparatus according to inventive concept 1, wherein the surface of the sample carrier that comprise the irregular pattern comprises a surface of a sample chamber that is configured to carry the sample therein.

Inventive concept 6. The apparatus according to inventive concept 1, wherein the carrier comprises a cover, and wherein the surface of the sample carrier that comprise the irregular pattern comprises a surface of the cover.

Inventive concept 7. The apparatus according to inventive concept 1, wherein the surface of the sample carrier that comprise the irregular pattern comprises a surface of the sample carrier that is located on the sample carrier outside any chamber.

Inventive concept 8. The apparatus according to inventive concept 1, wherein the optical measurement device comprises a microscope.

Inventive concept 9. The apparatus according to inventive concept 1, wherein the sample carrier comprises two or more irregular patterns.

Inventive concept 10. The apparatus according to inventive concept 1, wherein the said sample carrier comprises two or more chambers, each configured to carry a portion of the sample therein.

Inventive concept 11. The sample carrier according to inventive concept 10, wherein at least one of said at least one irregular pattern is located on a surface of each of said two or more chambers.

Inventive concept 12. A sample carrier configured for containing a sample to be analyzed by an optical measurement device having a maximal visual examining zone of area A at a diagnostic imaging magnification, wherein the initial imaging position of the carrier may vary by a length L in at least one of the X and Y axis of a plane being perpendicular to the optic axis of the optic device and having a visual examining zone of area S, said sample carrier comprising at least one irregular pattern having an area A', where A'=$f$(A,L); such that any image having the same shape and area as that of the visual examining zone taken at an expected initial location of the irregular pattern would comprise a portion of the pattern that has a geometric pattern unique to that portion.

Inventive concept 13. A sample carrier configured for containing a sample to be analyzed by an optical measurement device the carrier comprising at least one irregular geometric pattern having an area of at least 6 $mm^2$ such that any portion of the pattern having the same size and shape and having an area of 0.3 $mm^2$ or more and comprising at least a portion of the pattern has a geometric pattern unique to that portion.

Inventive concept 14. The sample carrier of inventive concept 13, wherein an inscribing circle of said irregular geometric pattern measures at least 3 mm in diameter, and does not measure less than 2 mm in two perpendicular directions.

Inventive concept 15. The sample carrier of inventive concept 13, wherein the inscribing circle of said portion measures at least 0.5 mm in diameter, and does not measure less than 0.4 mm in two perpendicular directions.

Inventive concept 16. An automated microscope configured to analyze a sample within a sample carrier comprising:
an optical module;
a support for holding a sample carrier; and
a controller configured to:
operate the optical module to capture ten orientation images or less of the sample carrier at a predetermined location; and
analyze the images to deduce at least one of a position and orientation of the carrier or a portion thereof with respect to at least one of an XY plane and a z axis of the microscope,
wherein the sample carrier comprises at least one irregular pattern and the irregular pattern is sized and positioned on a sample carrier surface such that at least one of said ten orientation images or less shows the irregular pattern or a part thereof without searching.

Inventive concept 17. An automated microscope according to inventive concept 16, wherein the irregular pattern is patterned such that any portion of an orientation image that shows the irregular pattern or a part thereof shows a geometric pattern unique to that portion.

Inventive concept 18. An automated microscope according to inventive concept 16, wherein the irregular pattern is sized, shaped and positioned such that one image per pattern is sufficient for determining at least one of a position and orientation of the sample carrier.

Inventive concept 19. A sample carrier for a microscope, comprising at least one chamber configured for containing therein a sample to be analyzed, said chamber comprising:
a cavity with a platform disposed therein and having a platform surface elevated above a floor surface of the cavity; and
a cover covering said cavity spaced from said platform surface;
wherein said platform surface comprises a first mark and a said cover comprises on a surface thereof a second mark, wherein the focusing distance between the first mark and the second mark allows determining a vertical length of the space between said platform surface and a bottom surface of said cover.

Inventive concept 20. A sample carrier for a microscope according to inventive concept 19, wherein the second mark is on the bottom surface of said cover.

Inventive concept 21. A sample carrier for a microscope according to inventive concept 19, wherein the first mark and second mark overlap along the Z axis.

Inventive concept 22. A sample carrier for a microscope according to inventive concept 19, wherein at least one of the first mark and second mark comprises an irregular pattern.

Inventive concept 23. A method for determining a volume of a portion of a fluid sample in a sample carrier of inventive concept 19, comprising:

introducing the fluid sample into said sample carrier such that the sample fills a volume having a height defined between said platform surface and a bottom surface of said cover;
determining an area A of a portion of said platform surface;
focusing an optical module of the microscope on said first mark and registering an indication of the focusing distance $F_1$ for said first mark;
focusing an optical module of the microscope on said second mark and registering an indication of the focusing distance $F_2$ for said second mark; and
determining based on $F_1$, $F_2$ and A, a volume of the fluid sample located on said portion of the platform surface.

The apparatus and methods described herein may be used in conjunction with apparatus and methods described in any one of the following patent applications, all of which are incorporated herein by reference:
US 2012/0169863 to Bachelet;
US 2014/0347459 to Greenfield;
US 2015/0037806 to Pollak;
US 2015/0316477 to Pollak;
US 2016/0208306 to Pollak;
US 2016/0246046 to Yorav Raphael;
US 2016/0279633 to Bachelet;
US 2018/0246313 to Eshel;
WO 16/030897 to Yorav Raphael;
WO 17/046799 to Eshel;
WO 17/168411 to Eshel;
WO 17/195205 to Pollack; and
WO 17/195208 to Zait.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus for determining a property of a bodily sample using a microscope and optical-density-measurement apparatus, the apparatus comprising:
a sample carrier that comprises:
a plurality of microscopy sample chambers configured to receive a first portion of the sample and to facilitate imaging of the first portion of the sample by the microscope, each of the microscopy sample chambers having an upper and a lower surface, and having respective heights between the upper and lower surfaces that are different from each other, and
at least one optical-density-measurement chamber configured to receive a second portion of the sample, and to facilitate optical density measurements being performed by the optical-density-measurement apparatus upon the second portion of the sample.

2. The apparatus according to claim 1, wherein the sample carrier defines an optical-density-measurement sample chamber outlet hole configured to allow air to escape from the optical-density-measurement sample chamber when the optical-density-measurement sample chamber is being filled, wherein the sample carrier defines an optical-density-measurement sample chamber inlet hole configured to facilitate filing of the optical-density-measurement sample chamber with the second portion bodily sample, and wherein the optical-density-measurement sample chamber inlet hole is disposed in a vicinity of a first end of the optical-density-measurement sample chamber and the optical-density-measurement sample chamber outlet hole is disposed in a vicinity of a second end of the optical-density-measurement sample chamber.

3. The apparatus according to claim 1, wherein at least one of an upper surface and a lower surface of the sample carrier is defined by a glass sheet, wherein the other surface of the upper surface and the lower surface of the sample carrier is defined by a molded component, and wherein the glass sheet and the molded component are coupled to each other via a pressure-sensitive adhesive.

4. The apparatus according to claim 1, further comprising a computer processor configured to:
   perform measurements upon cell types within the bodily sample that have a relatively high density upon microscopic images of a microscopy sample chamber having a relatively low height, and
   perform measurements upon cell types within the bodily sample that have a relatively low density upon microscopic images of a microscopy sample chamber having a relatively great height.

5. The apparatus according to claim 1, wherein the optical-density-measurement sample chamber is shaped to define a first region and a second region, with the optical-density-measurement sample chamber defining a predefined variation in height between the first region and the second region.

6. The apparatus according to claim 1, wherein the sample carrier defines one or more microscopy sample chamber outlet holes configured to allow air to escape from the microscopy sample chambers when the microscopy sample chambers are being filled, wherein the sample carrier defines an microscopy sample chamber inlet hole configured to facilitate filing of the microscopy sample chambers with the first portion of the bodily sample, and wherein the microscopy sample chamber inlet hole is disposed in a vicinity of a first end of the microscopy sample chambers and the one or more microscopy sample chamber outlet holes are disposed in a vicinity of a second end of the microscopy sample chambers.

7. The apparatus according to claim 6, wherein the sample carrier further defines one or more gutters that are configured to allow air to flow to the one or more microscopy sample chamber outlet holes.

8. The apparatus according to claim 6, wherein the sample carrier further defines one or more gutters that are configured to allow the bodily sample to flow around a central portion of at least one of the microscopy sample chambers.

* * * * *